United States Patent
Wei et al.

(10) Patent No.: US 8,039,543 B2
(45) Date of Patent: *Oct. 18, 2011

(54) COMPOSITION COMPRISING A COUPLING AGENT AND A CYCLOOLEFIN, THE COUPLING AGENT COMPRISING A REACTION PRODUCT OF AN EPOXY-SUBSTITUTED CYCLOOLEFIN AND AN AROMATIC AMINE

(75) Inventors: Xiaolan Wei, Clifton Park, NY (US); Wendy Wen-Ling Lin, Niskayuna, NY (US); Warren Rosal Ronk, West Chester, OH (US)

(73) Assignee: General Electric Company, Niskayuna, NY (US)

( * ) Notice: Subject to any disclaimer, the term of this patent is extended or adjusted under 35 U.S.C. 154(b) by 343 days.

This patent is subject to a terminal disclaimer.

(21) Appl. No.: 11/849,417

(22) Filed: Sep. 4, 2007

(65) Prior Publication Data
US 2009/0062441 A1 Mar. 5, 2009

(51) Int. Cl.
| | |
|---|---|
| C08G 61/08 | (2006.01) |
| C08K 5/16 | (2006.01) |
| C08K 5/10 | (2006.01) |
| C08K 5/00 | (2006.01) |
| C08K 3/38 | (2006.01) |
| C08K 3/28 | (2006.01) |
| C08K 3/22 | (2006.01) |
| C08F 8/00 | (2006.01) |
| C08F 4/60 | (2006.01) |
| C08F 4/80 | (2006.01) |
| C08F 4/00 | (2006.01) |
| C08F 24/00 | (2006.01) |
| C08F 210/02 | (2006.01) |
| C08L 67/00 | (2006.01) |

(52) U.S. Cl. ........ 524/553; 524/198; 524/315; 524/397; 524/404; 524/428; 524/430; 525/59; 525/418; 526/169.3; 526/171; 526/204; 526/273; 526/348.8

(58) Field of Classification Search .................. 523/466, 523/468; 525/468
See application file for complete search history.

(56) References Cited

U.S. PATENT DOCUMENTS
5,055,499 A * 10/1991 Endo et al. .................... 523/214
5,063,103 A   11/1991 Sugawara et al.
(Continued)

FOREIGN PATENT DOCUMENTS
EP   0936231 B1   9/2003
(Continued)

OTHER PUBLICATIONS

M.R Kessler et al.; Self-healing structural composite materials; Composites: Part A 34 (2003) 743-753; 11 Pages; Retrieved from- http://www.autonomic.uiuc.edu/files/publications_papers/2003_Kessler_Composites.pdf.

(Continued)

*Primary Examiner* — Mark Eashoo
*Assistant Examiner* — David Karst
(74) *Attorney, Agent, or Firm* — Mary Louise Gioeni

(57) ABSTRACT

A composition includes a first cylcoolefin substituted with at least one epoxy group and an aromatic amine. The composition is capable of bonding to a filler having a corresponding binding site. The composition is compatible with a metathesis catalyst capable of catalyzing a ring-opening metathesis polymerization reaction when contacted with the first cycloolefin. An associated method is also provided.

27 Claims, 8 Drawing Sheets

U.S. PATENT DOCUMENTS

| | | | |
|---|---|---|---|
| 5,096,644 A | 3/1992 | Endo et al. | |
| 5,728,785 A | 3/1998 | Grubbs et al. | |
| 5,840,238 A | 11/1998 | Setiabudi et al. | |
| 5,939,504 A | 8/1999 | Woodson, Jr. et al. | |
| 6,001,488 A | 12/1999 | Kataoka et al. | |
| 6,001,909 A | 12/1999 | Setiabudi | |
| 6,040,363 A * | 3/2000 | Warner et al. | 523/214 |
| 6,323,296 B1 | 11/2001 | Warner et al. | |
| 6,346,581 B1 * | 2/2002 | Tsunogae et al. | 525/332.1 |
| 6,379,799 B1 | 4/2002 | Almen | |
| 6,409,875 B1 | 6/2002 | Giardello et al. | |
| 6,423,780 B1 | 7/2002 | Dershem et al. | |
| 6,436,476 B1 | 8/2002 | Sage, Jr. | |
| 6,750,272 B2 | 6/2004 | Kessler et al. | |
| 6,890,650 B2 | 5/2005 | Hedden | |
| 6,946,523 B2 | 9/2005 | Dershem et al. | |
| 7,022,790 B2 | 4/2006 | Elce et al. | |
| 7,339,006 B2 | 3/2008 | Giardello et al. | |
| 2002/0099168 A1 | 7/2002 | Dershem et al. | |
| 2002/0198426 A1 * | 12/2002 | Morgan et al. | 585/502 |
| 2004/0242836 A1 | 12/2004 | Hayes et al. | |
| 2006/0154099 A1 | 7/2006 | Kodemura et al. | |
| 2007/0073079 A1 | 3/2007 | Liaw et al. | |

FOREIGN PATENT DOCUMENTS

| | | |
|---|---|---|
| EP | 0931816 B1 | 4/2005 |
| EP | 1320566 B1 | 12/2005 |
| WO | 2006023511 A1 | 3/2006 |

OTHER PUBLICATIONS

Alan S Jones et al; Catalyst Morphology and Dissolution Kinetics of Self-Healing Polymers; Chem. Mater. 2006, 18, 1312-1317; 6 Pages; Retrieved from- http://www.autonomic.uiuc.edu/files/publications_papers/2006_Jones_Catalyst_Morphology.pdf.

Xiaolan Wei et al; Composition and Associated Method; Filed Herewith.

Wendy Wen-Ling Lin et al; Article and Associated Method; File Herewith.

* cited by examiner

COMPOSITION COMPRISING A COUPLING AGENT AND A CYCLOOLEFIN, THE COUPLING AGENT COMPRISING A REACTION PRODUCT OF AN EPOXY-SUBSTITUTED CYCLOOLEFIN AND AN AROMATIC AMINE

BACKGROUND

1. Technical Field

The invention includes embodiments that relate to a coupling agent composition. The invention includes embodiments that relate to a method of making and using the coupling agent composition.

2. Discussion of Related Art

Metathesis polymerization reactions (for example, ring opening metathesis polymerization of cycloolefins) may provide for synthesis of polycycloolefins by controlled polymerization reaction. Polymers synthesized by ring opening metathesis polymerization may be reinforced with reinforcing materials (for example, fibers) to provide composites for high performance applications.

Performance properties of the composites may be affected by fiber loading, adhesion between the fibers and the polymer, polymer properties, and the like. Poor adhesion between the fibers and the polymer may affect the performance characteristics of the composites. Adhesion between the fibers and the polymer may be enhanced by employing coupling agents, sizing agents for the fibers, or both coupling agents and sizing agents. Coupling agents or sizing agents may adversely affect the catalytic efficiency of metathesis catalysts employed in ring opening metathesis polymerizations.

It may be desirable to have coupling agent compositions and methods of using the coupling agent compositions in composites that have characteristics that are different from those currently available. It may be desirable to have composites and methods of making the composites that have characteristics that are different from those currently available.

BRIEF DESCRIPTION

In one embodiment, a composition is provided. The composition includes a coupling agent composition and a polymer precursor. The coupling agent composition includes an aromatic amine and a first cycloolefin substituted with at least one epoxy group. The coupling agent composition is capable of bonding to a filler having a corresponding binding site and the coupling agent composition is compatible with a metathesis catalyst capable of catalyzing a ring-opening metathesis polymerization reaction when contacted to the first cycloolefin or the second cycloolefin. The polymer precursor includes a second cycloolefin. In one embodiment, a composition includes the filler having binding sites.

In one embodiment, a method is provided. The method includes contacting a first cycloolefin substituted with at least one epoxy group with an aromatic amine to form a coupling agent composition. The method includes contacting the coupling agent composition with a polymer precursor including a second cycloolefin to form a curable composition. The coupling agent composition is capable of bonding to a filler-binding site and the coupling agent composition is compatible with a metathesis catalyst capable of catalyzing a ring-opening metathesis polymerization reaction when contacted to the first cycloolefin or the second cycloolefin.

BRIEF DESCRIPTION OF DRAWING FIGURES

DETAILED DESCRIPTION

Figure 1:
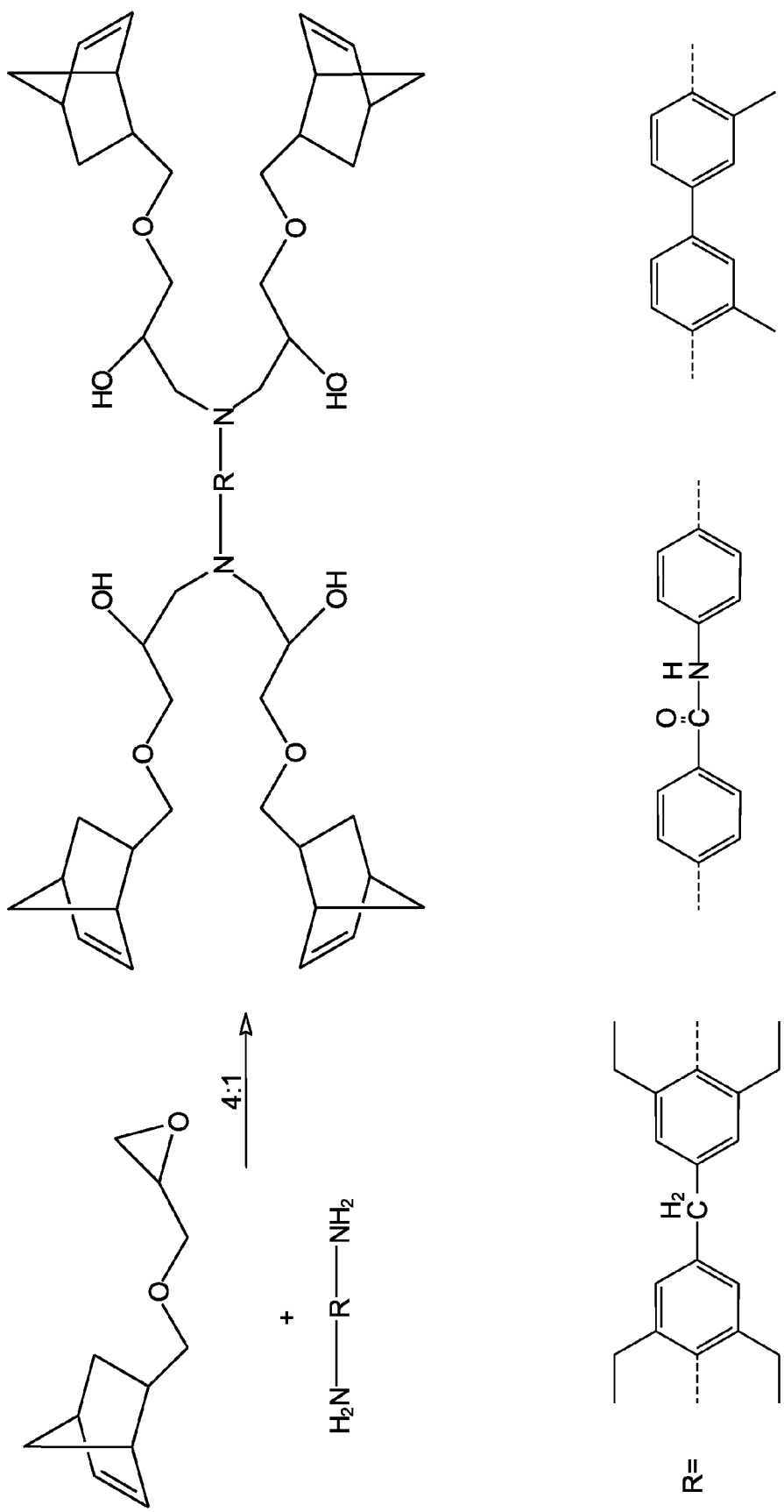
FIG. 1 shows the reaction scheme for synthesis of coupling agent composition in accordance with one embodiment of the invention.

The invention includes embodiments that relate to a coupling agent composition. The invention includes embodiments that relate to methods of making and using the coupling agent composition.

In the following specification and the clauses which follow, reference will be made to a number of terms have the following meanings. The singular forms "a", "an" and "the" include plural referents unless the context clearly dictates otherwise. Approximating language, as used herein throughout the specification and clauses, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity can not occur—this distinction is captured by the terms "may" and "may be".

In one embodiment, a coupling agent composition is provided. The coupling agent composition includes a first cycloolefin substituted with at least one epoxy group and an aromatic amine. The coupling agent composition is capable of bonding to a filler having a corresponding binding site. As used herein, the term "coupling agent" refers to a material that may provide for an improved interface or adhesion between the filler and a polymeric material. In one embodiment, a polymeric material may include a reaction product of a ring opening metathesis polymerization reaction of a cycloolefin.

A cycloolefin refers to a non-aromatic cyclic ring having at least one carbon-carbon double bond in the cyclic ring. A cycloolefin includes at least one metathesis-active double bond. A metathesis active double bond includes a bond that is capable of undergoing a metathesis reaction when contacted to a metathesis catalyst. A metathesis reaction of an olefin refers to a chemical reaction involving redistribution of alkene bonds. In one embodiment, a first cycloolefin may include at least one double bond that is capable of undergoing a ring opening metathesis polymerization reaction when contacted to a metathesis catalyst.

In one embodiment, the coupling agent composition is compatible with a metathesis catalyst capable of catalyzing a ring-opening metathesis polymerization reaction when contacted to a cycloolefin. As used herein the term compatible implies that the coupling agent composition does not react or interact with the metathesis catalyst in any way to poison the catalyst or affect the catalytic efficacy of the catalyst. In one embodiment, the catalytic efficacy may be described by the percentage conversion of the cycloolefin by the metathesis catalyst. A percentage conversion may be characterized by measuring the glass temperature of a cured cycloolefin using ASTM D4065 method. In one embodiment, the glass temperature of a cured cycloolefin prepared in the presence of the coupling agent composition may be the same as the glass temperature of a cured cycloolefin prepared in the absence of the coupling agent. In one embodiment, the glass temperature measured for a cured cycloolefin prepared in the presence of the coupling agent composition may be in a range of ±5 degrees Celsius of the glass temperature measured for a cured cycloolefin prepared in the absence of the coupling agent.

In one embodiment, a first cycloolefin includes at least one metathesis-active double bond that is capable of undergoing a ring opening metathesis polymerization when contacted to a metathesis catalyst and the metathesis catalyst is compatible with the coupling agent composition. In one embodiment, the epoxy group and the amine group in the coupling agent composition are compatible with the metathesis catalyst and do not react or interact with the metathesis catalyst in any way to poison the catalyst or affect the catalytic efficacy of the catalyst.

In one embodiment, a metathesis catalyst may include a structure having a formula (I)

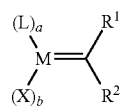

(I)

wherein "a" and "b" are independently integers from 1 to 3, with the proviso that "a+b" is less than or equal to 5;
M is ruthenium or osmium;
X is independently at each occurrence an anionic ligand;
L is independently at each occurrence a neutral electron donor ligand;
$R^1$ is hydrogen, an aliphatic radical, a cycloaliphatic radical, or an aromatic radical; and
$R^2$ is an aliphatic radical, a cycloaliphatic radical, or an aromatic radical, or two or more of X, L, $R^1$ and $R^2$ independently form a cyclic group.

Aliphatic radical is an organic radical having at least one carbon atom, a valence of at least one and may be a linear or branched array of atoms. Aliphatic radicals may include heteroatoms such as nitrogen, sulfur, silicon, selenium and oxygen or may be composed exclusively of carbon and hydrogen. Aliphatic radical may include a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example, carboxylic acid derivatives such as esters and amides), amine groups, nitro groups and the like. For example, the 4-methylpent-1-yl radical is a $C_6$ aliphatic radical comprising a methyl group, the methyl group being a functional group, which is an alkyl group. Similarly, the 4-nitrobut-1-yl group is a $C_4$ aliphatic radical comprising a nitro group, the nitro group being a functional group. An aliphatic radical may be a haloalkyl group that includes one or more halogen atoms, which may be the same or different. Halogen atoms include, for example; fluorine, chlorine, bromine, and iodine. Aliphatic radicals having one or more halogen atoms include the alkyl halides: trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals include allyl, aminocarbonyl (—$CONH_2$), carbonyl, dicyanoisopropylidene —$CH_2C(CN)_2CH_2$—), methyl (—$CH_3$), methylene (—$CH_2$—), ethyl, ethylene, formyl (—CHO), hexyl, hexamethylene, hydroxymethyl (—$CH_2OH$), mercaptomethyl (—$CH_2SH$), methylthio (—$SCH_3$), methylthiomethyl (—$CH_2SCH_3$), methoxy, methoxycarbonyl ($CH_3OCO$—), nitromethyl (—$CH_2NO_2$), thiocarbonyl, trimethylsilyl (($CH_3)_3Si$—), t-butyldimethylsilyl, trimethoxysilylpropyl (($CH_3O)_3SiCH_2CH_2CH_2$—), vinyl, vinylidene, and the like. By way of further example, a "$C_1$-$C_{30}$ aliphatic radical" contains at least one but no more than 30 carbon atoms. A methyl group ($CH_3$—) is an example of a $C_1$ aliphatic radical. A decyl group ($CH_3(CH_2)_9$—) is an example of a $C_{10}$ aliphatic radical.

A cycloaliphatic radical is a radical having a valence of at least one, and having an array of atoms, which is cyclic but which is not aromatic. A cycloaliphatic radical may include one or more non-cyclic components. For example, a cyclohexylmethyl group ($C_6H_{11}CH_2$—) is a cycloaliphatic radical, which includes a cyclohexyl ring (the array of atoms, which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. A cycloaliphatic radical may include one or more functional groups, such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylcyclopent-1-yl radical is a $C_6$ cycloaliphatic radical comprising a methyl group, the methyl group being a functional group, which is an alkyl group. Similarly, the 2-nitrocyclobut-1-yl radical is a $C_4$ cycloaliphatic radical comprising a nitro group, the nitro group being a functional group. A cycloaliphatic radical may include one or more halogen atoms, which may be the same or different. Halogen atoms include, for example, fluorine, chlorine, bromine, and iodine. Cycloaliphatic radicals having one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene 2,2-bis(cyclohex-4-yl) (—$C_6H_{10}C(CF_3)_2C_6H_{10}$—), 2-chloromethylcyclohex-1-yl; 3-difluoromethylenecyclohex-1-yl; 4-trichloromethylcyclohex-1-yloxy, 4-bromodichloromethylcyclohex-1-ylthio, 2-bromoethylcyclopent-1-yl, 2-bromopropylcyclohex-1-yloxy (e.g. $CH_3CHBrCH_2C_6H_{10}$—), and the like. Further examples of cycloaliphatic radicals include 4-allyloxycyclohex-1-yl, 4-aminocyclohex-1-yl ($H_2NC_6H_{10}$—), 4-aminocarbonylcyclopent-1-yl ($NH_2COC_5H_8$—), 4-acetyloxycyclohex-1-yl, 2,2-dicyanoisopropylidenebis(cyclohex-4-yloxy) $OC_6H_{10}C(CN)_2C_6H_{10}O$—), 3-methylcyclohex-1-yl, methylenebis(cyclohex-4-yloxy) (—$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl; hexamethylene-1,6-bis(cyclohex-4-yloxy) (—$OC_6H_{10}(CH_2)_6C_6H_{10}O$—); 4-hydroxymethylcyclohex-1-yl (4-$HOCH_2C_6H_{10}$—), 4-mercaptomethylcyclohex-1-yl (4-$HSCH_2C_6H_{10}$—), 4-methylthiocyclohex-1-yl (4-$CH_3SC_6H_{10}O$—), 4-methoxycyclohex-1-yl, 2-methoxycarbonylcyclohex-1-yloxy (2-$CH_3OCOC_6H_{10}O$—), 4-nitromethylcyclohex-1-yl ($NO_2CH_2C_6H_{10}O$—), 3-trimethylsilylcyclohex-1-yl, 2-t-butyldimethylsilylcyclopent-1-yl, 4-trimethoxysilylethylcyclohex-1-yl (e.g. $(CH_3O)_3SiCH_2CH_2C_6H_{10}$—), 4-vinylcyclohexen-1-yl, vinylidenebis(cyclohexyl), and the like. The term "a $C_3$-$C_{30}$ cycloaliphatic radical" includes cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

An aromatic radical is an array of atoms having a valence of at least one and having at least one aromatic group. This may include heteroatoms such as nitrogen, sulfur, selenium, silicon and oxygen, or may be composed exclusively of carbon and hydrogen. Suitable aromatic radicals may include phenyl, pyridyl, furanyl, thienyl, naphthyl, phenylene, and biphenyl radicals. The aromatic group may be a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthracenyl groups (n=3) and the like. The aromatic radical also may include non-aromatic components. For example, a benzyl group may be an aromatic radical, which includes a phenyl ring (the aromatic group) and a methylene group (the non-aromatic component). Similarly a tetrahydronaphthyl radical is an aromatic radical comprising an aromatic group ($C_6H_3$) fused to a non-aromatic component —$(CH_2)_4$—. An aromatic radical may include one or more functional groups, such as alkyl groups, alkenyl groups, alkynyl groups, haloalkyl groups, haloaromatic groups, conjugated dienyl groups, alcohol groups, ether groups, thio groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group, which is an alkyl group. Similarly, the 2-nitrophenyl group is a C6 aromatic radical comprising a nitro group, the nitro group being a functional group. Aromatic radicals include halogenated aromatic radicals such as trifluoromethylphenyl, hexafluoroisopropylidenebis(4-phen-1-yloxy) (—$OPhC(CF_3)_2PhO$—), chloromethylphenyl, 3-trifluorovinyl-2-thienyl, 3-trichloromethylphen-1-yl (3-$CCl_3Ph$-), 4-(3-bromoprop-1-yl)phen-1-yl ($BrCH_2CH_2CH_2Ph$-), and the like. Further examples of aromatic radicals include 4-allyloxyphen-1-oxy, 4-aminophen-1-yl ($H_2NPh$-), 3-aminocarbonylphen-1-yl ($NH_2COPh$-), 4-benzoylphen-1-yl, dicyanoisopropylidenebis(4-phen-1-yloxy) (—$OPhC(CN)_2PhO$—), 3-methylphen-1-yl, methylenebis(phen-4-yloxy) (—$OPhCH_2PhO$—), 2-ethylphen-1-yl, phenylethenyl, 3-formyl-2-thienyl, 2-hexyl-5-furanyl; hexamethylene-1,6-bis(phen-4-yloxy) (—$OPh(CH_2)_6PhO$—), 4-hydroxymethylphen-1-yl (4-$HOCH_2Ph$-), 4-mercaptomethylphen-1-yl (4-$HSCH_2Ph$-), 4-thiophenyl (—S-Ph), 4-methylthiophen-1-yl (4-$CH_3SPh$-), 3-methoxyphen-1-yl, 2-methoxycarbonylphen-1-yloxy (e.g., methyl salicyl), 2-nitromethylphen-1-yl (-$PhCH_2NO_2$), 3-trimethylsilylphen-1-yl, 4-t-butyldimethylsilylphenl-1-yl, 4-vinylphen-1-yl, vinylidenebis(phenyl), and the like. The term "a $C_3$-$C_{30}$ aromatic radical" includes aromatic radicals containing at least three but no more than 30 carbon atoms. The aromatic radical 1-imidazolyl ($C_3H_2N_2$—) represents a $C_3$ aromatic radical. The benzyl radical ($C_7H_7$—) represents a $C_7$ aromatic radical.

In one embodiment, ruthenium or osmium may form a metal center of the catalyst. In one embodiment, Ru or Os in the catalyst may be in the +2 oxidation state, may have an electron count of 16, and may be penta-coordinated. In an alternate embodiment, Ru or Os in the catalyst may be in the +2 oxidation state, may have an electron count of 18, and may be hexa-coordinated.

The catalyst may include one or more neutral electron-donating ligand, one or more anionic ligand, and an alkylidene radical as shown hereinabove in formula (I). A neutral electron-donating ligand, an anionic ligand or an alkylidene radical may be bonded to the metal center by coordination bond formation. As used herein, the term "neutral electron-donating ligand" refers to ligands that have a neutral charge when removed from the metal center. As used herein the term "alkylidene radical" refers to a substituted or unsubstituted divalent organic radical formed from an alkane by removal of two hydrogen atoms from the same carbon atom, the free valencies of which are part of a double bond. In one embodiment, a carbon atom in the alkylidene radical may form a double bond with the metal center in the metal complex. A carbon atom in the alkylidene radical may be substituted with $R^1$ and $R^2$, wherein $R^1$ and $R^2$ are as defined hereinabove.

An anionic ligand X in formula (I) may be a unidentate ligand or bidentate ligand. In one embodiment, X in formula (I) may be independently at each occurrence a halide, a carboxylate, a sulfonate, a sulfonyl, a sulfinyl, a diketonate, an alkoxide, an aryloxide, a cyclopentadienyl, a cyanide, a cyanate, a thiocyanate, an isocyanate, or an isothiocyanate. In one embodiment, X in formula (I) may be independently at each occurrence chloride, fluoride, bromide, iodide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate.

The number of anionic ligands X bonded to the metal center may depend on one or more of the coordination state of the transition metal (for example, penta-coordinated or hexa-coordinated), the number of neutral electron donating ligands bonded to the transition metal, or dentency of the anionic ligand. In one embodiment, X in formula (I) may include a unidentate anionic ligand and "b" may be 2. In one embodiment, X in formula (I) may include a bidentate anionic ligand and "b" may be 1. In one embodiment, X in formula (I) may be independently at each occurrence a chloride and "b" may be 2.

In one embodiment, an electron donor ligand L in formula (I) may be independently at each occurrence a monodentate, a bidentate, a tridentate, or a tetradentate neutral electron donor ligand. In one embodiment, at least one L may be phosphine, phosphite, phosphinite, phosphonite, arsine, stibine, ether, amine, amide, imine, sulfoxide, carboxyl, nitrosyl, or thioethene. In one embodiment, at least one L may be a phosphine having formula $P(R^3R^4R^5)$, where $R^3$, $R^4$, and $R^5$ are each independently an aliphatic radical, a cycloaliphatic radical, or an aromatic radical. In one embodiment, at least L may include $P(cyclohexyl)_3$, $P(cyclopentyl)_3$, $P(isopropyl)_3$, or $P(phenyl)_3$.

In one embodiment, at least one L may be a heterocyclic ligand. A heterocyclic ligand refers to an array of atoms forming a ring structure and including one or more heteroatoms as part of the ring, where heteroatoms are as defined hereinabove. A heterocyclic ligand may be aromatic (heteroarene ligand) or non-aromatic, wherein a non-aromatic heterocyclic ligand may be saturated or unsaturated. A heterocyclic ligand may be further fused to one or more cyclic ligand, which may be a heterocycle or a cyclic hydrocarbon, for example in indole.

In one embodiment, at least one L may be a heteroarene ligand. A heteroarene ligand refers to an unsaturated heterocyclic ligand in which the double bonds form an aromatic system. In one embodiment, at least one L is furan, thiophene, pyrrole, pyridine, bipyridine, picolylimine, gamma-pyran, gamma-thiopyran, phenanthroline, pyrimidine, bipyrimidine, pyrazine, indole, coumarone, thionaphthene, carbazole, dibenzofuran, dibenzothiophene, pyrazole, imidazole, benzimidazole, oxazole, thiazole, dithiazole, isoxazole, isothiazole, quinoline, bisquinoline, isoquinoline, bisisoquinoline, acridine, chromene, phenazine, phenoxazine, phenothiazine, triazine, thianthrene, purine, bisimidazole, or bisoxazole. In one embodiment, at least one L may be a monodentate heteroarene ligand, which may be unsubstituted or substituted, for example, pyridine. In one embodiment at least one L may be a bidentate heteroarene ligand, which may be substituted or unsubstituted, for example, bipyridine, phenanthroline, bithiazole, bipyrimidine, or picolylimine.

In one embodiment, at least one L may be a N-heterocyclic carbene ligand (NHC). A N-heterocyclic carbene ligand is a heterocyclic ligand including at least one N atom in the ring and a carbon atom having a free electron pair. Examples of NHC ligands may include ligands of formula (II), (III), or (IV)

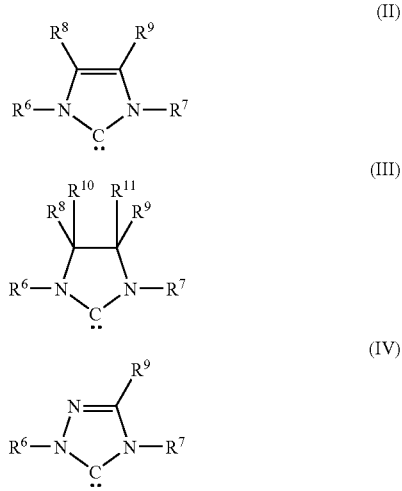

wherein $R^6$, $R^7$, $R^8$, $R^9$, $R^{10}$, or $R^{11}$ may be independently at each occurrence hydrogen, an aliphatic radical, a cycloaliphatic radical, or an aromatic radical. In one embodiment, $R^8$, $R^9$, $R^{10}$, and $R^{11}$ may be independently at each occurrence hydrogen. In one embodiment, $R^6$ and $R^7$ may be independently at each occurrence a substituted or an unsubstituted aromatic radical.

In one embodiment, a N-heterocyclic carbene ligand may include 1,3-dimesitylimidazolidin-2-ylidene, 1,3-di(1-adamantyl)imidazolidin-2-ylidene, 1-cyclohexyl-3-mesitylimidazolidin-2-ylidene, 1,3-dimesityloctahydrobenzimidazol-2-ylidene, 1,3-diisopropyl-4-imidazolin-2-ylidene, 1,3-di(1-phenylethyl)-4-imidazolin-2-ylidene, 1,3-dimesityl-2,3-dihydrobenzimidazol-2-ylidene, 1,3,4-triphenyl-2,3,4,5-tetrahydro-1H-1,2,4-triazol-5-ylidene, 1,3-dicyclohexylhexahydropyrimidin-2-ylidene, N,N,N',N'-tetraisopropylformamidinylidene, 1,3,4-triphenyl-4,5-dihydro-1H-1,2,4-triazol-5-ylidene, or 3-(2,6-diisopropylphenyl)-2,3-dihydrothiazol-2-ylidene.

The number of neutral electron donor ligands L bonded to the transition metal may depend on one or more of the coordination state of the transition metal (for example, penta-coordinated or hexa-coordinated), the number of anionic ligands bonded to the transition metal, or dentency of the neutral electron donor ligand. In one embodiment, "a" in formula (I) may be 1. In one embodiment, "a" in formula (I) may be 2. In one embodiment, "a" in formula (I) may be 3. In one embodiment, $R^1$, $R^2$, X and L may be bound to one another in an arbitrary combination to form a multidentate chelate ligand. In one embodiment two or more of $R^1$, $R^2$, X or L may independently form a cyclic ring, for example, $R^1$ and $R^2$ may together form a substituted or unsubstituted indene group.

In one embodiment, at least one L in formula (I) may include a phosphine ligand. In one embodiment, at least one L in formula (I) may include $P(cyclohexyl)_3$, $P(cyclopentyl)_3$, $P(isopropyl)_3$, or $P(phenyl)_3$. In one embodiment, at least one L in formula (I) may include a monodentate pyridine ligand, which is unsubstituted or substituted. In one embodiment, at least one L in formula (I) may include a bromine-substituted monodentate pyridine ligand. In one embodiment, at least one L in formula (I) may include a N-heterocyclic carbene ligand (NHC). In one embodiment, at least one L in formula (I) may include an NHC ligands having formula (II), (III), or (IV).

In one embodiment, $R^2$ in formula (I) may include an aromatic radical. In one embodiment, $R^2$ in formula (I) may include a substituted or an unsubstituted benzyl radical. In one embodiment, at least one X in formula (I) may include a halide. In one embodiment, at least one X in formula (I) may include a chloride.

In one embodiment, a composition having a formula (I) may include Bis(tricyclohexylphosphine) benzylidine ruthenium(IV) chloride (CAS No. 172222-30-9), 1,3-Bis(2,4,6-trimethylphenyl)-2-imidazolidinylidene)dichloro(phenylmethylene)(tricyclohexylphosphine)ruthenium (CAS No. 246047-72-3), 1,3-Bis(2,4,6-trimethylphenyl)-2-imidazolidinylidene)dichloro(phenylmethylene)(di-3-bromopyridine)ruthenium, or 1,3-Bis-(2,4,6-trimethylphenyl)-2-imidazolidinylidene) dichloro(o-isopropoxyphenylmethylene) ruthenium (CAS No. 301224-40-8).

In one embodiment, a first cycloolefin may include one or more of cyclooctadiene, cyclooctene, cyclotetraene, cyclodecene, cyclododecene, or a derivative thereof. In one embodiment, a first cycloolefin may include a strained cyclic structure (for example, norbornene). In one embodiment, a first cycloolefin may include one or more heteroatoms (for example, oxanorbornene). A heteroatom is an atom other than carbon and hydrogen, and may include the group 15 or group 16 atom of the periodic table. In one embodiment, a heteroatom may include N, O, P, S, As or Se atoms. In one embodiment, a first cycloolefin may include at least two carbon-carbon double bonds (for example, norbornadiene). In one embodiment, a first cycloolefin may include two or more cyclic rings that may be fused with each other (for example, dicyclopentadiene).

The first cycloolefin is substituted with at least one epoxy group. An epoxy group as used herein refers to a functional group including an oxygen atom joined by single bonds to two adjacent carbon atoms, and forming a three-membered ring. In one embodiment, a first cycloolefin may be substituted with an epoxy group that is pendant or external to the ring structure of the cycloolefin, for example, a glycidyl ether-substituted cycloolefin. In an alternative embodiment, a first cycloolefin may be substituted with an epoxy group that is internal to the ring structure of the cycloolefin, for example, cycloaliphatic epoxies.

In one embodiment, a first cycloolefin may include a structure having a formula (V), (VI), or (VII):

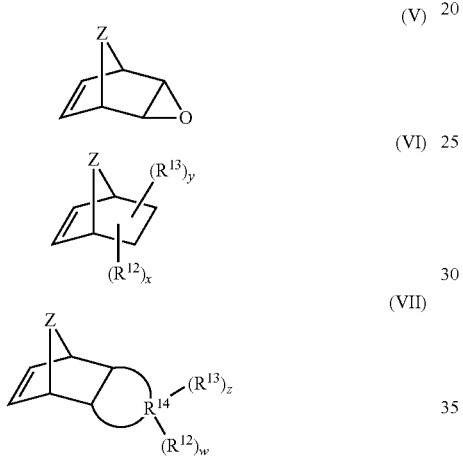

wherein "w" is 0, 1, 2, or 3, "x" is 0 or 1, "y" is 1 or 2, "z" is 1, 2, 3, or 4, $R^{12}$ is independently at each occurrence a halogen atom, an aliphatic radical, a cycloaliphatic radical, an aromatic radical, an alkoxy group, a hydroxy group, an ether group, an aldehyde group, a ketone group, a silanyl group, a phosphanyl group, a nitro group, or a divalent bond linking two carbon atoms;

$R^{13}$ includes at least one epoxy group;

$R^{14}$ is an aliphatic cyclic ring, a heterocycle, an aromatic group, or an imide group; and Z is $C(R^{15})_2$, $C=C(R^{15})_2$, $Si(R^{15})_2$, O, S, N—$R^{15}$, P—$R^{15}$, B—$R^{15}$, or As—$R^{15}$, wherein $R^{15}$ is independently at each occurrence hydrogen, an aliphatic radical, a cycloaliphatic radical, or an aromatic radical. Aliphatic, aromatic, and heterocycle are as defined hereinabove.

In one embodiment, a first cycloolefin may include a structure having a formula (VIII) to (XX)

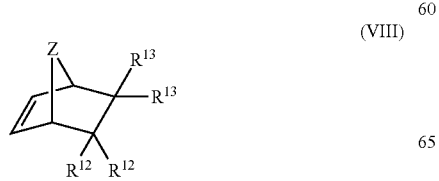

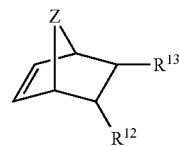

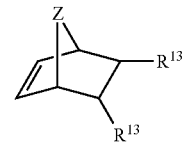

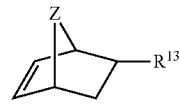

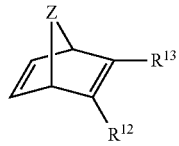

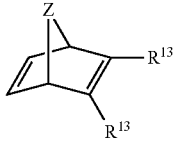

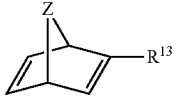

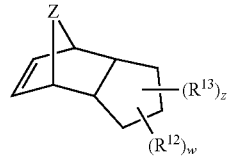

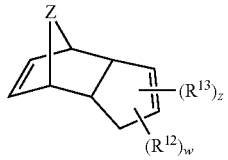

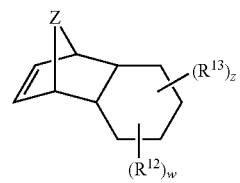

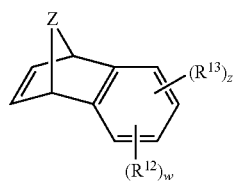

-continued

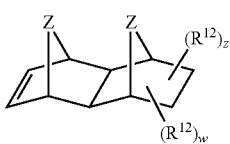 (XIX)

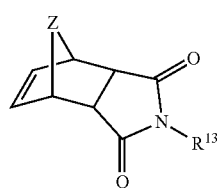 (XX)

wherein "w", "z", $R^{12}$, $R^{13}$ and Z are as defined hereinabove.

In one embodiment, $R^{13}$ may include a structure having a formula (XXI)

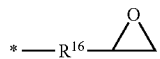 (XXI)

wherein $R^{16}$ may be a divalent group including an aliphatic radical, an aromatic radical, or a cycloaliphatic radical. In one embodiment, $R^{16}$ may include an aliphatic radical and one or more of ester group, amide group, carbonate group, ether group, a ketone group, or a siloxane group. In one embodiment, $R^{16}$ may include —$(CH_2)_j$—O—$(CH_2)_k$—, —COO$(CH_2)_j$—, —(CH2)j-O—CONH—$(CH_2)_k$—, —$CH_2)_j$—OCO—$(CH_2)_k$—, or —$(CH_2)_j$—CO—$(CH_2)_k$—, wherein "j" and "k" are independently from 0 to 10. In one embodiment, $R^{16}$ may include —$(CH_2)$—O—$(CH_2)$— or —O—$(CH_2)$—.

The coupling agent composition includes an aromatic amine. In one embodiment, an aromatic amine includes at least one primary amine group. A primary amine group is a derivative of ammonia in which one hydrogen is replaced by a hydrocarbon group. In one embodiment, an aromatic amine includes at two primary amine groups. In one embodiment, an aromatic amine includes more than two primary amine groups.

As described hereinabove, the coupling agent composition may be compatible with a metathesis catalyst capable of initiating a ring opening polymerization reaction of the cycloolefin. In one embodiment, an aromatic amine may include at least one primary amine group and the aromatic amine may be compatible with the metathesis catalyst. In one embodiment, a primary amine group of the aromatic amine may not poison the metathesis catalyst.

In one embodiment, the aromatic amine includes a structure having a formula (XXII).

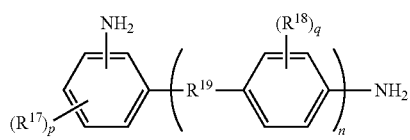 (XXII)

wherein "n" is 0, 1, 2, or 3, "p" and "q" are independently 0, 1, 2, 3, or 4;
$R^{17}$ and $R^{18}$ are independently at each occurrence hydrogen, a halogen atom, an aliphatic radical, a cycloaliphatic radical, or an aromatic radical; and
$R^{19}$ is a bond, $C(R^{20})_2$, $C=C(R^{20})_2$, $C(=O)NR^{20}$, $Si(R^{20})_2$, O, S, N—$R^{20}$, P—$R^{20}$, B—$R^{20}$, or As—$R^{20}$, wherein $R^{20}$ is independently at each occurrence hydrogen, a halogen atom, an aliphatic radical, a cycloaliphatic radical, or an aromatic radical.

In one embodiment, the aromatic amine includes a structure having a formula (XXIII) to (XXIX)

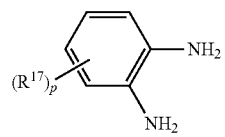 (XXIII)

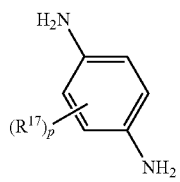 (XXIV)

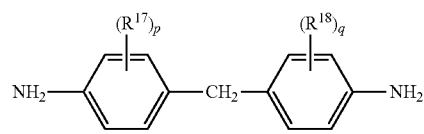 (XXV)

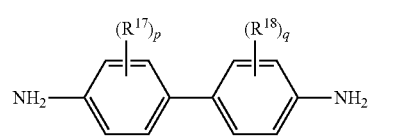 (XXVI)

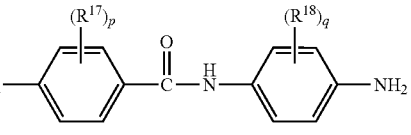 (XXVII)

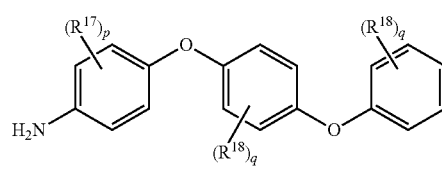 (XXVIII)

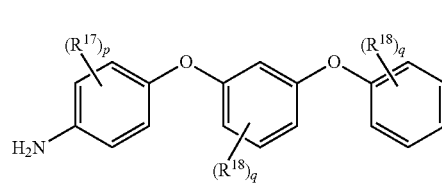 (XXIX)

wherein "p", "q", $R^{17}$ and $R^{18}$ are as defined hereinabove.

In one embodiment, $R^{17}$ and $R^{18}$ in formula (XXII) are independently at each occurrence hydrogen. In one embodiment, $R^{17}$ and $R^{18}$ in formula (XXII) are independently at each occurrence an aliphatic radical. In one embodiment, $R^{17}$ and $R^{18}$ in formula (XXII) are independently at each occurrence an ethyl radical. In one embodiment, $R^{19}$ in formula (XXII) is a bond, an oxygen atom, or a $C(R^{20})_2$ group. In one embodiment, "n" in formula (XXII) is 0. In one embodiment, "n" in formula (XXII) is 1. In one embodiment, "n" in formula (XXII) is 2.

A molar ratio of the first cycloolefin to the aromatic amine in the coupling agent composition may be determined by one or more of the number of amine groups per molecule in the aromatic amine, the number of epoxy groups per molecule in the first cycloolefin, or the number of reactive amine sites desired in the reaction product of the first cycloolefin and the amine, or the percentage conversion of the epoxy group and amine group. A reactive amine site may refer to an amine group capable of reacting or interacting with one or more of the epoxy group in the first cycloolefin, binding sites on filler, or an epoxy compound. In one embodiment, a reactive amine may be capable of reacting with the epoxy group in the first cycloolefin, binding sites on filler, or an epoxy compound by covalent bond formation. In one embodiment, a reactive amine may be capable of interacting with the epoxy group in the first cycloolefin, binding sites on filler, or an epoxy compound by polar interactions. A reactive amine site may include a primary amine group, a secondary amine group, a tertiary amine group, a quaternary amine group, or an ammonium salt.

Figure 2:
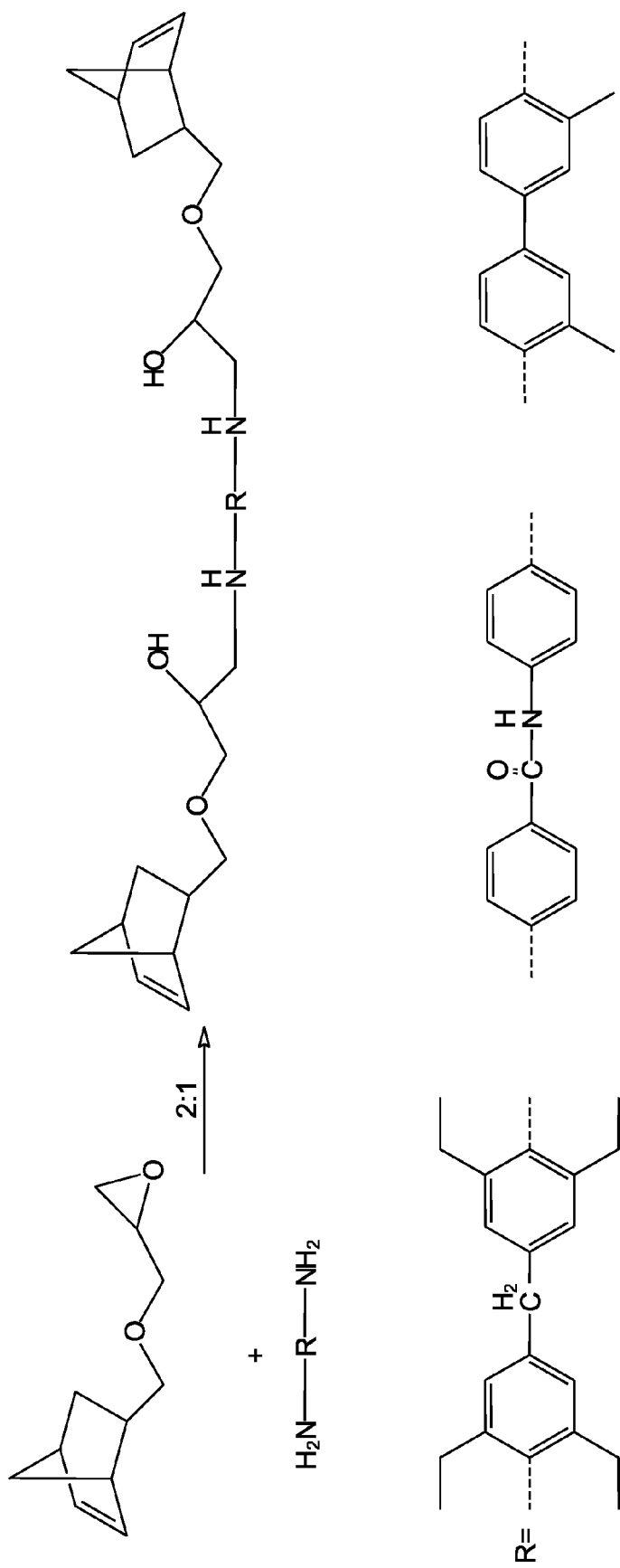
FIG. 2 shows the reaction scheme for synthesis of coupling agent composition in accordance with one embodiment of the invention.
Figure 3:
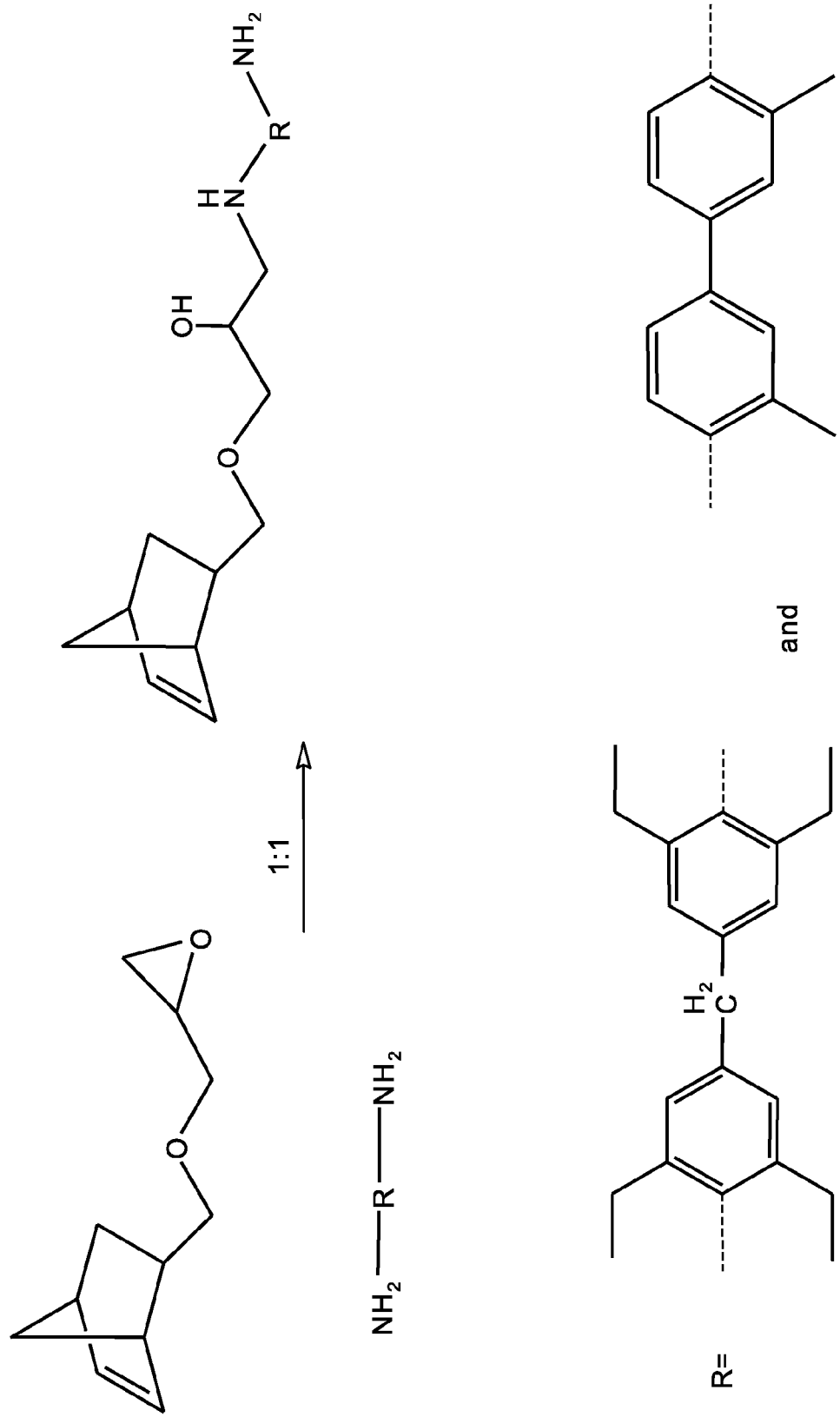
FIG. 3 shows the reaction scheme for synthesis of coupling agent composition in accordance with one embodiment of the invention.

In one embodiment, by way of example, a first cycloolefin may include one epoxy group and an aromatic amine may include two primary amine groups. The number of reactive amine sites in the reaction product may depend on the molar ratio of the first cycloolefin and the amine or the percentage conversion. In one embodiment, a 4:1 molar ratio of the cycloolefin to the amine may result in a reaction product free of any primary or secondary amine sites as shown in FIG. 1. In another embodiment, a reaction may not go to completion and a 4:1 molar ratio of the cycloolefin to the amine may result in a reaction product having one or more primary or secondary reactive amine site. Similarly, in one embodiment, a 2:1 molar ratio of the cycloolefin to the amine may result in a reaction product having secondary amine sites as shown in FIG. 2. A 1:1 molar ratio of the cycloolefin to the amine may result in a reaction product having a primary amine site in one embodiment as shown in FIG. 3.

In one embodiment, the reactive amine sites in the reaction product may provide for one or more of bond formation between the coupling agent composition and the corresponding binding sites in a filler, bond formation between a polycycloolefin and the corresponding binding sites in a filler, bond formation between an epoxy compound and the corresponding binding sites in a filler crosslinking reaction between a first cycloolefin and a second cycloolefin, crosslinking reaction between the first cycloolefin and an epoxy compound, or crosslinking reaction between a polycycloolefin and an epoxy compound.

In one embodiment, an epoxy group or an amine group of the coupling agent composition is capable of covalent bond formation with the corresponding binding sites in the filler. In one embodiment, a binding site may include one or more of an epoxy group, a hydroxyl group, an amine group, an amide group, a nitrate group, an isocyanate group, a carbamate groups, a urea group, a carbonyl group, or a carboxylic group. In one embodiment, a binding site may include one or more of a silanol group, a siloxane group, or an acrylate group. In one embodiment, a filler may include a sizing composition. A sizing composition may include one or more of epoxy, urethane, polyvinyl alcohol, vinyl ester, polyester, or fatty acid ester.

In one embodiment, a filler may include epoxy groups on the surface and the coupling agent composition may bond to the filler by epoxy-amine bond formation. In one embodiment, a filler may include amine groups on the surface and the coupling agent composition may bond to the filler by epoxy-amine bond formation. In another embodiment, an epoxy group or an amine group of the coupling agent composition is capable of physical bond formation with the corresponding binding sites in the filler, for example by polar interactions or hydrogen bond formation. In one embodiment, a filler may include hydroxyl groups on the surface and the coupling agent composition may bond to the filler by hydrogen bond formation. In yet another embodiment, a filler may include an epoxy-based sizing composition and the coupling agent composition may bond to the filler by epoxy amine bond formation.

In one embodiment, a molar ratio of the cycloolefin to the aromatic amine may be in a range of from about 1:9 to about 1:6, from about 1:6 to about 1:3, or from about 1:3 to about 1:1. In one embodiment, a molar ratio of the cycloolefin to the aromatic amine may be in a range of from about 1:1 to about 2:1, from about 2:1 to about 3:1, or from about 3:1 to about 4:1. In one embodiment, a molar ratio of the cycloolefin to the aromatic amine may be in a range of from about 4:1 to about 6:1, from about 6:1 to about 8:1, or from about 8:1 to about 9:1. In one embodiment, a molar ratio of the cycloolefin to the aromatic amine may be in a range that is less than about 1:9. In one embodiment, a molar ratio of the cycloolefin to the aromatic amine may be in a range that is greater than about 9:1. In one embodiment, a molar ratio of the cycloolefin to the aromatic amine may be essentially about 2:1.

In one embodiment, a reaction product of the first cycloolefin and the aromatic amine is provided. In one embodiment, the coupling agent composition includes a reaction product of the first cycloolefin and the aromatic amine. The molar ratio of the first cycloolefin to the aromatic amine may determine the reaction product obtained. In one embodiment, a reaction product may include one or more of a primary amine site. In one embodiment, a reaction product may include one or more of a secondary amine site. In one embodiment, a reaction product may include two or more of primary amine sites. In one embodiment, a reaction product may include two or more of secondary amine sites. In one embodiment, a reaction product may be free of any primary amine sites and secondary amine sites. In one embodiment, a reaction product may include an unreacted epoxy group. In one embodiment, a reaction product may include an unreacted epoxy group, an unreacted amine group, or both an unreacted amine group and an unreacted epoxy group.

In one embodiment, the conversion of the first cycloolefin and the aromatic amine may be complete, that is, the reaction product may be free of any unreacted cycloolefin and amine. In one embodiment, the conversion of the first cycloolefin and the aromatic amine may be incomplete, that is, the reaction product may include unreacted cycloolefin and amine. In one embodiment, the conversion of the cycloolefin and the amine may be in a range that is greater than about 50 weight percent. In one embodiment, the conversion of the cycloolefin and the amine may be in a range of from about 50 weight percent to about 60 weight percent, from about 60 weight percent to about 70 weight percent, from about 70 weight percent to about 80 weight percent, from about 80 weight percent to about 90 weight percent, or from about 90 weight percent to about 100 weight percent.

In one embodiment, a composition may include a coupling agent composition as described hereinabove and a metathesis catalyst. A suitable metathesis catalyst may include a ruthenium or osmium ring-opening metathesis catalyst having a structure of formula (I).

In one embodiment, a composition may include a coupling agent composition as described hereinabove and a polymer precursor. A polymer precursor may include monomeric species, oligomeric species, mixtures of monomeric species, mixtures of oligomeric species, polymeric species, mixtures of polymeric species, partially-crosslinked species, mixtures of partially-crosslinked crosslinked species, or mixtures of two or more of the foregoing. In one embodiment, a polymer precursor may include a second cycloolefin, wherein cycloolefin is as defined hereinabove. In one embodiment, a second cycloolefin may ring open polymerize when contacted to a metathesis catalyst. In one embodiment, a second cycloolefin may copolymerize with the first cycloolefin when contacted with a metathesis catalyst.

The second cycloolefin may be strained or unstrained. In one embodiment, a second cycloolefin may include two or more carbon-carbon double bonds, for example, dienes. In one embodiment, a second cycloolefin may include one or more of cyclooctadiene, cyclooctene, cyclotetraene, cyclodecene, cyclododecene, or a derivative thereof. In one embodiment, a second cycloolefin may include a strained cyclic structure (for example, norbornene). In one embodiment, a second cycloolefin may include one or more heteroatoms (for example, oxanorbornene). In one embodiment, a first cycloolefin may include at least two carbon-carbon double bonds (for example, norbornadiene). In one embodiment, a second cycloolefin may include two or more cyclic rings that may be fused with each other (for example, dicyclopentadiene).

In one embodiment, a second cycloolefin may include one or more functional groups either as substituents of the second cycloolefin or incorporated into the carbon chain of the second cycloolefin. Suitable functional groups may include one or more of alcohol, thiol, ketone, aldehyde, ester, disulfide, carbonate, imine, carboxyl, amine, amide, nitro acid, carboxylic acid, isocyanate, carbodiimide, ether, halogen, quaternary amine, phosphate, sulfate or sulfonate. In one embodiment, the second cycloolefin may not be substituted with an epoxy group.

In one embodiment, a second cycloolefin may include at least one norbornene structural unit having a formula (XXX)

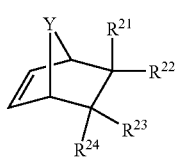
(XXX)

wherein $R^{21}$, $R^{22}$, $R^{23}$, and $R^{24}$ are independently one or more of hydrogen, alcohol, thiol, ketone, aldehyde, ester, disulfide, carbonate, imine, carboxyl, amine, amide, nitro acid, carboxylic acid, isocyanate, carbodiimide, ether, halogen, quaternary amine, carbohydrate, peptide, phosphate, sulfate, sulfonate, or $R^{21}$, $R^{22}$, $R^{23}$, and $R^{24}$ together form a cycloaliphatic radical, an aromatic radical, a cycloolefin, an imide group, or a divalent bond linking two carbon atoms; and Y is $C(R^{25})_2$, $C=C(R^{25})_2$, $Si(R^{25})_2$, O, S, $NR^{25}$, $PR^{25}$, $BR^{25}$, or $AsR^{25}$, wherein $R^{25}$ is independently at each occurrence hydrogen, an aliphatic radical, a cycloaliphatic radical, or an aromatic radical.

In one embodiment, a second cycloolefin may include one or more of norbornene, dicyclopentadiene, di(methyl)dicyclopentadiene, dilhydrodicyclopentadiene, cyclopentadiene trimer, cyclopentadiene tetramer, tetracyclododecene, ethylidenenorborniene, methyltetracyclododecene, methylnorborinene, ethylnorbornene, dimethylnorbornene, norbornadiene, cyclopentene, cycloheptene, cyclooctene, 7-oxanorbornene, 7-oxabicyclo[2.2.1]hept-5ene derivatives, 7-oxanorbornadiene, cyclododecene, 2-norbornene (also named bicyclo[2.2.1]-2-heptene), 5-methyl-2-norbornene, 5,6-dimethyl-2-norbornene, 5-ethyl-2-norbornene, 5-butyl-2-norbornene, 5-hexyl-2-norbornene, 5-dodecyl-2-norbornene, 5-isobutyl-2-norbornene, 5-octadecyl-2-norbornene, 5-isopropyl-2-norbornene, 5-phenyl-2-norbornene, 5-p-toluoyl-2-norbornene, 5-a-naphthyl-2-norbornene, 5-cyclohexyl-2-norbornene, 5,5-dimethyl-2-norbornene, dicyclopentadiene (or cyclopentadiene dimer), dihydrodicyclopentadiene (or cyclopentene cyclopentadiene codimer), methyl-cyclopentadiene dimer, ethyl-cyclopentadiene dimer, tetracyclododecene (also named 1,2,3,4,4a,5,8,8a-octahydro-1,4:5,8-dimethyanonaphthalene), 9-methyl-tetracyclo[6.2.1.1$^{3,6}$.0$^{2,7}$]-4-dodecene (also named 1,2,3,4,4a,5,8,8a-octahydro-2-methyl-4,4:5,8-dimethanonaphthalene), 9-ethyl-tetracyclo[6.2.1.1$^{3,6}$.0$^{2,7}$]-4-dodecene, 9-propyl-tetracyclo[6.2.1.1$^{3,6}$.0$^{2,7}$]-4-dodecene, 9-hexyl-tetracyclo[6.2.1.1$^{3,6}$.0$^{2,7}$]-4-dodecene, 9-decyl-tetracyclo[6.2.1.1$^{3,6}$.0$^{2,7}$]-4-dodecene, 9,10-dimethyl-tetracyclo[6.2.1.1$^{3,6}$.0$^{2,7}$]-4-dodecene, 9-ethlyl, 10-methyl-tetracyclo[6.2.1.1$^{3,6}$.0$^{2,7}$]-4-dodecene, 9-cyclohexyl-tetracyclo[6.2.1.1$^{3,6}$.0$^{2,7}$]-4-dodecene, 9-chloro-tetracyclo[6.2.1.1$^{3,6}$.0$^{2,7}$]-4-dodecene, 9-bromo-tetracyclo[6.2.1.1$^{3,6}$.0$^{2,7}$]-4-dodecene, cyclopentadiene-trimer, methyl-cyclopentadiene-trimer, or derivatives of the foregoing. In one embodiment, a second cycloolefin may include one or more functional groups either as substituents of the cycloolefin or incorporated into the carbon chain of the cycloolefin.

In one embodiment, a polymer precursor may include two or more of the aforementioned cycloolefins. In one embodiment, a polymer precursor may include mixtures of cycloolefins chosen to provide the desired end-use properties. In one embodiment, one or more functional properties of a polymeric material produced using the mixtures of cycloolefins may be determined by the type of functional groups present and the number of functional groups present.

In one embodiment, the polymer precursor may include an epoxy compound. A suitable epoxy compound may include monomeric species, oligomeric species, mixtures of monomeric species, mixtures of oligomeric species, polymeric species, mixtures of polymeric species, partially-crosslinked species, mixtures of partially-crosslinked crosslinked species, or mixtures of two or more of the foregoing, wherein one or more of the species include at least one epoxy group. An epoxy group is as defined hereinabove.

In one embodiment, a suitable epoxy compound may include an aliphatic radical substituted with one or more epoxy groups. In one embodiment, an epoxy compound may include a cycloaliphatic or an aromatic radical substituted with one or more epoxy groups. In some embodiments involving cycloaliphatic or aromatic radicals, a suitable epoxy compound may include an epoxy group substitution that is pendant or external to the ring structure, for example, a glycidyl ether-substituted compound. In alternative embodiments, a suitable compound may include an epoxy group substitution that is internal to the ring structure of the compound, for example, cycloaliphatic epoxies.

In one embodiment, a suitable epoxy compound may include one or more structural units having a formula (XXXI) or (XXXII)

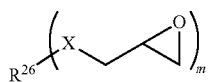

(XXXI)

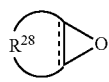

(XXXII)

wherein "m" is 1 or an integer greater than 1;
X is O, S, or N—$R^{27}$;
$R^{26}$ is an aliphatic radical, a cycloaliphatic radical, or an aromatic radical;
$R^{27}$ is independently at each occurrence hydrogen, an aliphatic radical, a cycloaliphatic radical, or an aromatic radical; and
$R^{28}$ is a cycloaliphatic radical or an aromatic radical. In one embodiment, $R^{27}$ includes an epoxy group.

In one embodiment, a suitable epoxy compound may include one or more structural units having a formula (XXXIII), (XXXIV), or (XXXV)

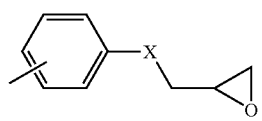

(XXXIII)

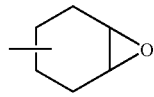

(XXXIV)

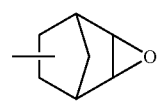

(XXXV)

In one embodiment, a suitable epoxy compound may include one or more structures having a formula (XXXVI) to (XLI).

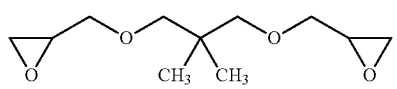

(XXXVI)

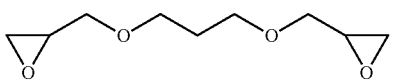

(XXXVII)

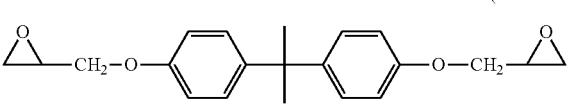

(XXXVIII)

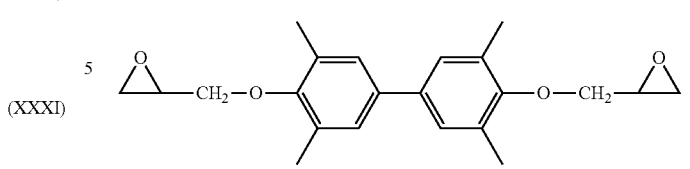

(XXXIX)

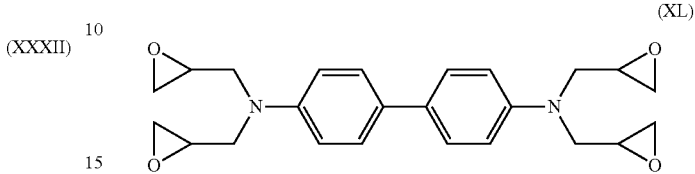

(XL)

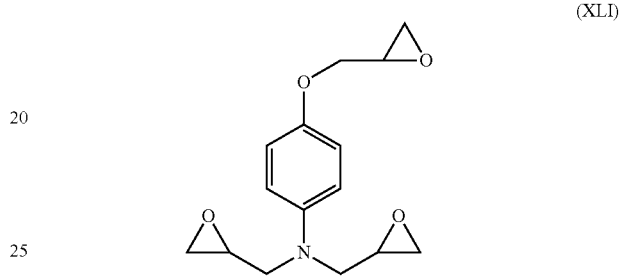

(XLI)

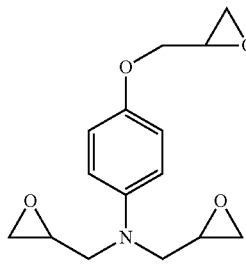

Other suitable examples of epoxy compounds may include aliphatic epoxy resins and cycloaliphatic epoxy resins such as EPON 825, EPON 826, and EPON 828 (from Hexion Specialty Chemicals); DEN 431, DEN 438, DEN 439, DEN 331, ERL-4221, CYRACURE® UVR-6110, CYRACURE® UVR-6107, and CYRACURE® UVR-6105 (from Dow Chemical Company); EPN 1138, EPN 1139, Tactix 556, MY 720, MY 0500, MY 0510, and Araldite 6010 (from Huntsman); 105 epoxy resin (from West System), Epiclon HP-7200L, Epiclon 430 (from Nippon Kayaku); UVACUREL® 1500 and SR 5208 (from Cytec Surface Specialties); Hysol EA 9390, EA 9396, and EA 9397 (from Henkel); Hexflow VRM 34 and Hexflow RTM 6 (from Hexcel); glycidyl ether of bisphenol-F; epoxy phenol novolac resin; DCPD epoxy novolac; aromatic glycidyl amine resins; cresol-novolac epoxy resins; biphenyl epoxy resins; multi-functional epoxy resins (i.e. epoxy resins comprising two or more epoxy groups); naphthalene epoxy resins (e.g., EPICLON® EXA-4700 from Dainippon Ink and Chemicals); divinylbenzene dioxide; 2-glycidylphenylglycidyl ether; dicyclopentadiene-type epoxy resins (e.g., EPICLON® HP-7200 from Dainippon Ink and Chemicals), or combinations thereof.

In one embodiment, an epoxy compound may have a number average molecular weight in a range of from about 50 grams per mole to about 100 grams per mole, from about 100 grams per mole to about 200 grams per mole, from about 200 grams per mole to about 500 grams per mole, from about 500 grams per mole to about 1000 grams per mole, from about 1000 grams per mole to about 2500 grams per mole, from about 2500 grams per mole to about 5000 grams per mole, from about 5000 grams per mole to about 10000 grams per mole, from about 10000 grams per mole to about 25000 grams per mole, from about 25000 grams per mole to about 50000 grams per mole, or from about 50000 grams per mole to about 100000 grams per mole. In one embodiment, an epoxy compound may have a number average molecular weight in a range of greater than about 100000 grams per mole.

A composition may include curing agents for epoxy compounds. A suitable curing agent may include one or more compounds capable of ring opening the epoxy group in the epoxy compound and initiating a curing reaction of the epoxy compound. A suitable curing agent may be compatible with the metathesis catalyst. In one embodiment, the aromatic amine in the coupling agent composition may function as a curing agent for the epoxy compound.

One or more of first cycloolefin, second cycloolefin, or an epoxy compound may function as a curable material. A curable material may refer to a material having one or more reactive groups that may participate in a chemical reaction when exposed to one or more of thermal energy, electromagnetic radiation, or chemical reagents. Curing as used herein may refer to a reaction resulting in polymerization, cross-linking, or both polymerization and cross-linking of a curable material (for example, epoxy compound or cycloolefin) having one or more reactive groups (for example, epoxy groups in the epoxy compound or metathesis-active bonds in the cycloolefin). Cured may refer to a curable material after a curing reaction such that the cured material is removable from a mold.

In one embodiment, a polymer precursor may include mixtures of cycloolefins, mixtures of epoxy compounds, or mixtures of cycloolefins and epoxy compounds. Suitable cycloolefins and epoxy compounds may be chosen based on the end-use properties desired. The relative amounts of the cycloolefins and the epoxy compounds may be determined by the end use properties desired.

In one embodiment, a coupling agent composition may be present in an amount in a range of from about 0.5 weight percent to about 1 weight percent of the combined weight of the composition (coupling agent, polymer precursor and metathesis catalyst). In one embodiment, a coupling agent composition may be present in an amount in a range of from about 1 weight percent to about 5 weight percent of the combined weight of the composition, from about 5 weight percent to about 10 weight percent of the combined weight of the composition, from about 10 weight percent to about 25 weight percent of the combined weight of the composition, or from about 25 weight percent to about 50 weight percent of the combined weight of the composition. In one embodiment, a coupling agent composition may be present in an amount that is greater than about 50 weight percent of the combined weight of the composition. Here and throughout the specification and claims, range limitations may be combined and/or interchanged. Such ranges as identified include all the sub-ranges contained therein unless context or language indicates otherwise.

In one embodiment, a polymer precursor may be present in an amount in a range of from about 0.5 weight percent to about 1 weight percent of the combined weight of the composition (coupling agent, polymer precursor and metathesis catalyst). In one embodiment, a polymer precursor may be present in an amount in a range of from about 1 weight percent to about 5 weight percent of the combined weight of the composition, from about 5 weight percent to about 10 weight percent of the combined weight of the composition, from about 10 weight percent to about 25 weight percent of the combined weight of the composition, or from about 25 weight percent to about 50 weight percent of the combined weight of the composition. In one embodiment, a polymer precursor may be present in an amount that is greater than about 50 weight percent of the combined weight of the composition.

In embodiments involving mixtures of cycloolefins, mixtures of epoxy compounds, or mixtures of cycloolefins and epoxy compounds as polymer precursors, the combined weight of the polymer precursor may present in an amount in a range of from about 0.5 weight percent to about 50 weight percent of the combined weight of the composition (coupling agent, polymer precursor and metathesis catalyst).

In some embodiments, involving mixtures of cycloolefins and epoxy compounds as polymer precursor, a weight ratio of the second cycloolefin(s) to the epoxy compound(s) may be in a range of from about 20:1 to about 15:1, from about 15:1 to about 12:1, from about 12:1 to about 10:1, from about 10:1 to about 8:1, from about 6:1 to about 4:1, from about 4:1 to about 3:1, from about 3:1 to about 2:1, or from about 2:1 to about 1:1. In some embodiments, involving mixtures of cycloolefins and epoxy compounds as polymer precursor, a weight ratio of the second cycloolefin(s) to the epoxy compound(s) may be in a range of from about 1:1 to about 1:2, from about 1:2 to about 1:3, from about 1:3 to about 1:4, from about 1:4 to about 1:6, from about 1:6 to about 18, from about 1:8 to about 1:10, from about 1:10 to about 1:15, or from about 1:15 to about 1:20.

In one embodiment, a curable composition is provided. A curable composition includes a coupling agent composition, a polymer precursor (second cycloolefin or mixture of second cycloolefin and epoxy compound), and a metathesis catalyst. A suitable metathesis catalyst may include a ruthenium or osmium ring-opening metathesis catalyst having a structure of formula (I).

In one embodiment, a metathesis catalyst may be present in an amount in a range of from about 0.001 weight percent to about 0.002 weight percent of the combined weight of the curable composition (coupling agent, metathesis catalyst and metathesis catalyst), from about 0.002 weight percent to about 0.005 weight percent of the combined weight of curable the composition, or from about 0.005 weight percent to about 0.01 weight percent of the combined weight of the curable composition. In one embodiment, a metathesis catalyst may be present in an amount in a range of from about 0.01 weight percent to about 0.02 weight percent of the combined weight of curable the composition, from about 0.02 weight percent to about 0.03 weight percent of the combined weight of the curable composition, from about 0.03 weight percent to about 0.05 weight percent of the combined weight of the curable composition, or from about 0.05 weight percent to about 0.1 weight percent of the combined weight of the curable composition. In one embodiment, a metathesis catalyst may be present in an amount that is greater than about 0.1 weight percent of the combined weight of the curable composition.

In one embodiment, a curable composition may include one or more crosslinking agents. A crosslinking agent may initiate a crosslinking reaction of the first cycloolefin, the second cycloolefin, or both the first cycloolefin and the cycloolefin post-cure by the metathesis catalyst. In one embodiment, a crosslinking may include a peroxide or a peroxide source. In one embodiment, a peroxide crosslinking agent may include one or more of an alkyl peroxide, for example tert-butyl peroxide or di-t-butyl peroxide, 2,5-dimethyl-2,5-di-(tert-butylperoxy) or hexyne-3, 2,5-dimethyl-2,5-di-(tert-butylperoxy) hexane. In one embodiment, the amount of peroxide in the curable composition may be in a range of from about 0.01 weight percent to about 10 weight percent of the curable composition.

In one embodiment, a curable composition may include a reaction control agent. A reaction control agent may be added to control the pot life of the reaction mixture. In one a preferred embodiment, a reaction control agent may include a neutral electron donor or a neutral Lewis base such as phosphines, sulfonated phosphines, phosphites, phosphinites, phosphonites, arsines, stibines, ethers, amines, amides, sulfoxides, carboxyls, nitrosyls, pyridines, thioethers, nitriles, thiophenes, and furans. In one embodiment, an electron donor or a Lewis base may include one or more functional groups selected from the group consisting of hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen. In one embodiment, a reaction control agent may include one or more of triphenylphosphine, tricyclopentylphosphine, tricyclohexylphosphine, triphenylphosphite, pyridine, propylamine, tributylphosphine, benzonitrile, triphenylarsine, anhydrous acetonitrile, thiophene, or furan. In one embodiment, a reaction control agent may include one or more of $P(cyclohexyl)_3$, $P(cyclopentyl)_3$, $P(isopropyl)_3$, $P(Phenyl)_3$, or pyridine.

Optionally, the curable composition may include one or more additives. Suitable additives may be selected with reference to performance requirements for particular applications. For example, a fire retardant additive may be selected where fire retardancy may be desired, a flow modifier may be employed to affect rheology or thixotropy, a reinforcing may be added where reinforcement may be desired, and the like. The additives may include one or more of flow control agents, modifiers, carrier solvents, viscosity modifiers, adhesion promoters, ultra-violet absorbers, flame-retardants, or reinforcing fillers. Defoaming agents, dyes, pigments, and the like may also be incorporated into composition. The amount of such additives may be determined by the end-use application.

A melt viscosity of the curable composition may depend on one or more of the molecular weight of the polymer precursor, temperature, or percentage conversion of the polymer precursor. In one embodiment, the curable composition may have flow properties (for example viscosity) at a particular temperature such that the composition may flow into a cavity of a mold. A curable composition prepared according to one embodiment, of the invention may be solvent free. A solvent-free filled composition in accordance with one embodiment, of the invention may have sufficiently low viscosity such that the composition may flow into a cavity of a mold.

In one embodiment, a curable composition may have a room temperature viscosity in a range of less than about 200 centipoise. In one embodiment, a curable composition may have a room temperature viscosity in a range of from about 1 centipoise to about 10 centipoise, from about 10 centipoise to about 20 centipoise, from about 20 centipoise to about 50 centipoise, from about 50 centipoise to about 100 centipoise, from about 100 centipoise to about 150 centipoise, or from about 150 centipoise to about 200 centipoise. In one embodiment, a curable composition may essentially have a room temperature viscosity in a range of less than about 60 centipoise. In one embodiment, a curable composition may essentially have a room temperature viscosity in a range of less than about 20 centipoise.

Stability of the curable composition may also depend on one or more of temperature, ambient conditions, and the like. Stability or resin work life, as used herein in the specification and claims, refers to a viscosity change for the curable composition that is less than 200 centi Poise after a duration of time. In one embodiment, the curable composition may be stable at a temperature in a range of about 20 degrees Celsius for a period of greater than about 1 hour. In one embodiment, the curable composition may be stable at a temperature in a range of from about 20 degrees Celsius to about 25 degrees Celsius, from about 25 degrees Celsius to about 30 degrees Celsius, from about 30 degrees Celsius to about 40 degrees Celsius, from about 40 degrees Celsius to about 50 degrees Celsius, or from about 50 degrees Celsius to about 60 degrees Celsius, and for a period of greater than about 10 minutes. In one embodiment, the curable composition may be stable at a temperature of about 20 degrees Celsius for a period of greater than about 1 day. In one embodiment, the curable composition may be stable at a temperature in a range of greater than about 20 degrees Celsius for a period of greater than about 10 days. In one embodiment, the curable composition may have a resin work life of about 1 hour at 20 degrees Celsius.

In one embodiment, a composition may include a reaction product of the curable composition including a coupling agent composition, a polymer precursor, and a metathesis catalyst. A reaction product may include one or more of a ring-opening polymerization reaction product of a first cycloolefin, a ring-opening polymerization reaction product of a second cycloolefin, a ring-opening polymerization reaction product of a first cycloolefin and a second cycloolefin, a crosslinked reaction product of the first cycloolefin and the second cycloolefin, or a crosslinked reaction product of the coupling agent composition and the epoxy compound (if present). In one embodiment, a composition may include a cured reaction product of the curable composition. In one embodiment, a composition may include an unfilled cured reaction product of the curable composition.

In one embodiment, a metathesis catalyst may initiate a ring opening metathesis polymerization reaction when contacted to a first cycloolefin or a second cycloolefin. In one embodiment, the conversion of the cycloolefin(s) may be complete, that is, the reaction product may be free of any unreacted cycloolefin(s). In one embodiment, the conversion of the cycloolefin(s) may be incomplete, that is, the reaction product may include unreacted cycloolefin(s). In one embodiment, the conversion of the cycloolefin(s) may be in a range that is greater than about 50 weight percent. In one embodiment, the conversion of the cycloolefin(s) may be in a range of from about 50 weight percent to about 60 weight percent, from about 60 weight percent to about 70 weight percent, from about 70 weight percent to about 80 weight percent, from about 80 weight percent to about 90 weight percent, or from about 90 weight percent to about 100 weight percent.

In one embodiment, the aromatic amine may initiate a curing reaction of the epoxy compound. In one embodiment, the conversion of the epoxy compound may be complete, that is, the reaction product may be free of any unreacted epoxy compound. In one embodiment, the conversion of the epoxy compound may be incomplete, that is, the reaction product may include unreacted epoxy compound. In one embodiment, the conversion of the epoxy compound may be in a range that is greater than about 40 weight percent. In one embodiment, the conversion of the epoxy compound may be in a range of from about 40 weight percent to about 50 weight percent, from about 50 weight percent to about 60 weight percent, from about 60 weight percent to about 70 weight percent, from about 70 weight percent to about 80 weight percent, from about 80 weight percent to about 90 weight percent, or from about 90 weight percent to about 100 weight percent.

In one embodiment, a composition may include a coupling agent composition as described hereinabove and filler having corresponding binding sites. In one embodiment, a composition may include a coupling agent composition bonded to one or more corresponding binding site on the filler. In one embodiment, a composition may include a reaction product of a first cycloolefin and an aromatic amine, wherein the reaction product is bonded to one or more corresponding binding site on the filler.

In one embodiment, a filler may include one or more materials selected from the group consisting of siliceous materials, carbonaceous materials, metal hydrates, metal oxides, metal borides, and metal nitrides. In one embodiment, a filler may essentially include carbonaceous materials.

The filler may include a plurality of particles. The plurality of particles may be characterized by one or more of average particle size, particle size distribution, average particle surface area, particle shape, or particle cross-sectional geometry.

In one embodiment, an average particle size of the filler may be less than about 1 nanometer. In one embodiment, an average particle size of the filler may be in a range of from about 1 nanometer to about 10 nanometers, from about 10 nanometers to about 25 nanometers, from about 25 nanometers to about 50 nanometers, from about 50 nanometers to about 75 nanometers, or from about 75 nanometers to about 100 nanometers. In one embodiment, an average particle size of the filler may be in a range of from about 0.1 micrometers to about 0.5 micrometers, from about 0.5 micrometers to about 1 micrometer, from about 1 micrometer to about 5 micrometers, from about 5 micrometer to about 10 micrometers, from about 10 micrometers to about 25 micrometers, or from about 25 micrometer to about 50 micrometers.

In one embodiment, an average particle size of the filler may be in a range of from about 50 micrometers to about 100 micrometers, from about 100 micrometers to about 200 micrometer, from about 200 micrometer to about 400 micrometers, from about 400 micrometer to about 600 micrometers, from about 600 micrometers to about 800 micrometers, or from about 800 micrometers to about 1000 micrometers. In one embodiment, an average particle size of the filler may be in a range of greater than about 1000 micrometers.

In another embodiment, filler particles having two distinct size ranges (a bimodal distribution) may be included in the composition: the first range from about 1 nanometers to about 500 nanometers, and the second range from about 0.5 micrometer (or 500 nanometers) to about 1000 micrometers (the filler particles in the second size range may be herein termed "micrometer-sized fillers").

Filler particle morphology can be selected to include shapes and cross-sectional geometries based on the process used to produce the particles. In one embodiment, a filler particle may be a sphere, a rod, a tube, a flake, a fiber, a plate, a whisker, or be part of a plurality that includes combinations of two or more thereof. In one embodiment, a cross-sectional geometry of the particle may be one or more of circular, ellipsoidal, triangular, rectangular, or polygonal.

In one embodiment, the filler may consist essentially of a fibrous material. A fibrous material may include a plurality of fibers and may be configured as a thread, a strand, yarn, a mat, a fabric, a woven roving, or a continuous filament. In one embodiment, a fibrous material may include one or more fiber having high strength. In one embodiment, a fibrous material may include continuous fibers. In one embodiment, a fibrous material may include discontinuous fibers. The strength of the fibers may be further increased by using techniques known in the art, such as, but not limited to, forming a plurality of layers or plies, by orientation of the fibers in a direction, and like methods.

In one embodiment, a fibrous material may include a glass fiber or a ceramic fiber. Suitable examples of glass fibers may include E-glass or S-glass fiber. In one embodiment, a fibrous material may include a polymer fiber. Suitable examples of fibers may include, but are not limited to, glass fibers (for example, quartz, E-glass, S-2 glass, R-glass from suppliers such as PPG, AGY, St. Gobain, Owens-Corning, or Johns Manville), polyester fibers, polyamide fibers (for example, NYLON® polyamide available from E.I. DuPont, Wilmington, Del., USA), aromatic polyamide fibers (such as KEVLAR® aromatic polyamide available from E.I. DuPont, Wilmington, Del., USA; or P84® aromatic polyamide available from Lenzing Aktiengesellschaft, Austria), polyimide fibers (for example, KAPTON® polyimide available from E.I. DuPont, Wilmington, Del., USA), or extended chain polyethylene (for example, SPECTRA® polyethylene from Honeywell International Inc., Morristown, N.J., USA; or DYNEEMA® polyethylene from Toyobo Co., Ltd.), and the like.

In one embodiment, a fibrous material may include a carbon fiber. Suitable examples of carbon fibers may include, but are not limited to, AS2C, AS4, AS4C, AS4D, AS7, IM6, IM7, IM9, and PV42/850 from Hexcel Corporation; TORAYCA T300, T300J, T400H, T600S, T700S, T700G, T800H, T800S, T1000G, M35J, M40J, M46J, M50J, M55J, M60J, M30S, M30G, and M40 from Toray Industries, Inc; HTS12K/24K, G30-500 3K/6K/12K, G30-500 12K, G30-700 12K, G30-700 24K F402, G40-800 24K, STS 24K, HTR 40 F22 24K 1550tex from Toho Tenax, Inc; 34-700, 34-700WD, 34-600, 34-600WD, 34-600 Unsized from Grafil inc.; T-300, T-650/35, T-300C, T-650/35C from Cytec Industries.

In one embodiment, the fillers may be aggregates or agglomerates prior to incorporation into the composition, or after incorporation into the composition. An aggregate may include more than one filler particle in physical contact with one another, while an agglomerate may include more than one aggregate in physical contact with one another. In some embodiments, the filler particles may not be strongly agglomerated and/or aggregated such that the particles may be relatively easily dispersed in the polymeric matrix.

In some embodiments, the filler particles may be subjected to mechanical or chemical processes to improve the dispersibility of the filler in the polymer matrix. In one embodiment, the filler may be subjected to a mechanical process, for example, high shear mixing prior to dispersing in the polymer matrix. In one embodiment, the filler particles may be chemically treated prior to dispersing in the polymeric matrix.

Chemical treatment may include removing polar groups from one or more surfaces of the filler particles to reduce aggregate and/or agglomerate formation. Chemical treatment may also include functionalizing one or more surfaces of the filler particles with functional groups that may improve the compatibility between the fillers and the polymeric matrix, reduce aggregate and/or agglomerate formation, or both improve the compatibility between the fillers and the polymeric matrix and reduce aggregate and/or agglomerate formation. In some embodiments, chemical treatment may include applying a sizing composition to one or more surfaces of the filler particles. In one embodiment, a suitable filler may include an epoxy-based sizing composition. In one embodiment, filler may essentially include carbon fibers sized with an epoxy-based composition.

A filler may include binding sites. In one embodiment, binding sites may include functional groups that may react or interact with the coupling agent composition to result in bond formation. As described hereinabove, in some embodiments, binding sites may be capable of covalent bond formation with the coupling agent composition. In other embodiments, binding sites may be capable of physical bond formation with the coupling agent composition, for example, van der Waals interactions or hydrogen bonding.

In one embodiment, suitable binding sites may be intrinsic to the filler, that is, present in the filler because of filler chemistry or processing steps involved in filler fabrication. In one embodiment, suitable binding sites may be included in the filler extrinsically, for example, by chemical treatment post-filler fabrication. In one embodiment, suitable binding sites in the filler may include both intrinsic and extrinsic functional groups. In one embodiment, a filler may include a sizing composition and the sizing composition may include one or more binding sites capable of bonding with the coupling agent composition. In one embodiment, suitable binding sites may include one or more of epoxy groups, amine groups, hydroxyl groups, isocyanate groups, carbamate groups, urea groups, or carboxylic groups. In one embodiment, a coupling agent composition may be capable of binding to the filler by epoxy-amine bond formation.

In one embodiment, the filler may be present in amount in a range of less than about 10 weight percent of the composition. In one embodiment, the filler may be present in amount in a range of from about 10 weight percent to about 20 weight percent of the composition, from about 20 weight percent to about 30 weight percent of the composition, from about 30 weight percent to about 40 weight percent of the composition, or from about 40 weight percent to about 50 weight percent. In one embodiment, the filler may be present in amount in a range of from about 50 weight percent to about 55 weight percent of the composition, from about 55 weight percent to about 65 weight percent of the composition, from about 65 weight percent to about 75 weight percent of the composition, from about 75 weight percent to about 95 weight percent of the composition, or from about 95 weight percent to about 99 weight percent of the composition. In one embodiment, the filler may be essentially present in amount in a range of from about 20 weight percent to about 80 weight percent of the composition. In one embodiment, the filler may be essentially present in amount in a range of from about 40 weight percent to about 80 weight percent of the composition.

In some embodiments, a coupling agent composition may be disposed on a filler surface before addition of polymer precursor and metathesis catalyst. In other embodiments, a coupling agent composition may be mixed with a polymer precursor and a metathesis catalyst before contacting with the filler.

In one embodiment, a composition may include a filler and a curable composition including a coupling agent composition, a polymer precursor, and a metathesis catalyst. A suitable metathesis catalyst may include a ruthenium or osmium ring-opening metathesis catalyst having a structure of formula (I).

In one embodiment, a filler may include a fibrous material and the fibrous material may be impregnated with the curable composition. In one embodiment, the fibrous material may be present in a mold. In one embodiment, a prepreg is provided. A prepreg may include a fibrous material having binding sites impregnated with a curable composition. The curable composition may include a coupling agent composition, a polymer precursor, and a metathesis catalyst.

In one embodiment, a composition may include a reaction product of a filler and a curable composition including a coupling agent composition, a polymer precursor, and a metathesis catalyst.

In one embodiment, a reaction product may include a partially cured reaction product of the curable composition and the filler. In one embodiment, a partially cured reaction product may refer to a cured product having sufficient structural integrity such that it can be removed from a mold. In one embodiment, a percent conversion of the curable material in the partially cured reaction product may be less than about 50 percent. In one embodiment, a percent conversion of the curable material in the partially cured reaction product may be in a range of from about 50 percent to about 60 percent, from about 60 percent to about 70 percent, from about 70 percent to about 80 percent, from about 80 percent to about 90 percent, or from about 90 percent to about 95 percent.

In one embodiment, a partially cured reaction product may be post-cured to form a cured composite structure. In one embodiment, a percent conversion of the curable material in the cured composite structure may be in a range of from about 50 percent to about 60 percent, from about 60 percent to about 70 percent, from about 70 percent to about 80 percent, from about 80 percent to about 90 percent, or from about 90 percent to about 100 percent.

A cured composite structure may have mechanical properties, thermal properties, or chemical properties depending on the end-use requirements. In one embodiment, a cured resin in the composite structure may have a tensile modulus in a range of from about 250,000 pounds per square inch (psi) to about 300,000 pounds per square inch (psi), from about 300,000 pounds per square inch (psi) to about 400,000 pounds per square inch (psi), from about 400,000 pounds per square inch (psi) to about 500,000 pounds per square inch (psi), from about 500,000 pounds per square inch (psi) to about 600,000 pounds per square inch (psi), or from about 600,000 pounds per square inch (psi) to about 700,000 pounds per square inch (psi).

Compression strength for the composite structure may be measured using ASTM method D6641. In one embodiment, the composite structure may include a fibrous material and the fibers may be present in a direction parallel to the load during the test (0 degrees) and perpendicular to the load direction during the test (90 degrees direction). In one embodiment, a cured composite structure made with half the fibers in the 0 degree direction and half in the 90 degree direction may have a compression strength in a range of from about 30 kilo pounds per square inch (ksi) to about 40 kilo pounds per square inch (ksi), from about 40 kilo pounds per square inch (ksi) to about 50 kilo pounds per square inch (ksi), from about 50 kilo pounds per square inch (ksi) to about 60 kilo pounds per square inch (ksi), from about 60 kilo pounds per square inch (ksi) to about 70 kilo pounds per square inch (ksi), from about 70 kilo pounds per square inch (ksi) to about 80 kilo pounds per square inch (ksi), from about 80 kilo pounds per square inch (ksi) to about 90 kilo pounds per square inch (ksi), or from about 90 kilo pounds per square inch (ksi) to about 100 kilo pounds per square inch (ksi).

Toughness value for the composite structure may be measured using ASTM D5528-01 method for Mode I and an internally developed test using end-notch-flexure technique for Mode II. In one embodiment, the cured composite structure may have a toughness value in Mode I in a range of from about 2 pounds per inch to about 5 pounds per inch, from about 5 pounds per inch to about 10 pounds per inch, from about 10 pounds per inch to about 15 pounds per inch, or from about 15 pounds per inch to about 20 pounds per inch. In one embodiment, the cured composite structure may have a toughness value in Mode II in a range of from about 5 pounds per inch to about 10 pounds per inch, from about 10 pounds per inch to about 20 pounds per inch, from about 20 pounds per inch to about 30 pounds per inch, from about 30 pounds per inch to about 40 pounds per inch, or from about 40 pounds per inch to about 50 pounds per inch.

Glass transition temperature for the cured composite structure may be measured using ASTM method D4065. In one embodiment, the cured composite structure may have a glass transition temperature that is greater than about 120 degrees Celsius. In one embodiment, the cured composite structure may have a glass transition temperature that is greater than about 150 degrees Celsius. In one embodiment, the cured composite structure may have a glass transition temperature that is greater than about 175 degrees Celsius. In one embodiment, the cured composite structure may have a glass transition temperature that is greater than about 200 degrees Celsius.

In one embodiment, a cured composite structure may be chemically resistant. In one embodiment, a cured composite structure may exhibit chemical resistance desired for the specific end-use. In one embodiment, chemical resistance may be defined as less than 15 percent reduction in compression strength after exposure to chemicals such as methyl ethyl ketone, acids, hydraulic fluids such as Skydrol, detergent, or engine fuels.

In one embodiment, a method is provided. A method may include contacting a first cycloolefin substituted with at least one epoxy group with an aromatic amine to form a coupling agent composition. Weight fractions of the first cycloolefin and the aromatic amine may depend on one or more factors described hereinabove. Contacting may be carried out in solution using appropriate solvents or in the solid state. In one embodiment, contacting may be carried out in the melt state in the absence of a solvent. In one embodiment, contacting may include mixing of the first cycloolefin and the aromatic amine using stirrers, mixers, and the like.

In one embodiment, a first cycloolefin may be contacted with the aromatic amine at a temperature in a range of from about 100 degrees Celsius to about 125 degrees Celsius, from about 125 degrees Celsius to about 150 degrees Celsius, from about 150 degrees Celsius to about 175 degrees Celsius, or from about 175 degrees Celsius to about 200 degrees Celsius. In one embodiment, a first cycloolefin may be contacted with the aromatic amine at a temperature essentially in a range of from about 175 degrees Celsius to about 200 degrees Celsius.

In one embodiment, a method may include contacting the coupling agent composition with filler having binding sites. In one embodiment, a cycloolefin and an aromatic amine may be reacted together to form the coupling agent composition before contacting the resulting coupling agent composition with the filler. In an alternate embodiment, filler may be contacted with the unreacted first cycloolefin and the aromatic amine and the resulting composition may be further processed (for example, heated) to produce a filler having a coupling agent composition disposed thereon.

In one embodiment a method may include binding the coupling agent composition to the filler binding site. In one embodiment, binding may be initiated at room temperature. In one embodiment, binding may be initiated at a temperature in a range of from about 20 degrees Celsius to about 200 degrees Celsius. In one embodiment, a method may include binding the coupling agent composition to the filler by epoxy-amine bond formation.

In one embodiment, a coupling agent composition may be contacted with filler by coating the filler surface by dipping the fillers in a solution of the coupling agent composition or by spraying the fillers with a solution of the coupling agent composition. Solutions of coupling agent compositions if employed may include solvents having sufficiently volatility to allow for evaporation of the solvent. In one embodiment, a coupling agent composition may be contacted with the filler using solid-state deposition techniques.

In one embodiment, a coupling agent composition may be contacted with a polymer precursor to form a curable composition. In one embodiment, a coupling agent composition may be contacted with a polymer precursor and a metathesis catalyst to form a curable composition. The curable composition may be then contacted with the filler. In one embodiment, a filler may include a fibrous material placed in a cavity of a mold. A curable material may be dispensed into the mold to impregnate the fibrous material.

In one embodiment, a method may include heating the curable composition to a first temperature to form a partially cured reaction product, wherein partially cured reaction product is as defined hereinabove. In one embodiment, a curable composition may be heated to a first temperature in a range of from about 20 degrees Celsius to about 30 degrees Celsius, from about 30 degrees Celsius to about 40 degrees Celsius, from about 40 degrees Celsius to about 50 degrees Celsius, from about 50 degrees Celsius to about 60 degrees Celsius, or from about 60 degrees Celsius to about 75 degrees Celsius. In one embodiment, a curable composition may be heated to a first temperature of about 60 degrees Celsius. In one embodiment, a curable composition may be heated to a first temperature for a sufficient duration of time such that a partially cured reaction product is formed.

In one embodiment, a partially cured reaction product may be post-cured by heating the partially cured composition to a second temperature to form a cured composite structure. In one embodiment, a partially cured reaction product may be heated to a second temperature in a range of from about 75 degrees Celsius to about 100 degrees Celsius, from about 100 degrees Celsius to about 125 degrees Celsius, from about 125 degrees Celsius to about 150 degrees Celsius, from about 150 degrees Celsius to about 175 degrees Celsius, or from about 175 degrees Celsius to about 200 degrees Celsius. In one embodiment, a partially cured reaction product may be heated to a second temperature of about 200 degrees Celsius. In one embodiment, a partially cured reaction product may be heated to a second temperature for a sufficient duration of time such that a cured composite structure is formed.

In one embodiment, a method may include binding the coupling agent to the filler binding sites. In one embodiment, binding of the coupling agent to the filler binding sites may be affected in the first curing step, the post-curing step, or both the first curing step and the post-curing steps. In one embodiment, a method may include binding the coupling agent composition to the filler binding sites by epoxy-amine bond formation.

In one embodiment, a method may include initiating a curing reaction of the polymer precursor. In one embodiment, a curing reaction of the polymer precursor may include ring opening metathesis polymerization reaction of the first cycloolefin, the second cycloolefin, or both the first cycloolefin and the second cycloolefin. In one embodiment, a curing reaction of the polymer precursor may include a curing reaction of the epoxy compound. In one embodiment, a curing reaction may include one or more of double bond crosslinking or redistribution reaction initiated by heat or peroxide. In one embodiment, a method may include initiating a curing reaction of the epoxy compound by the aromatic amine.

A method may include curing the curable composition to form an article. In one embodiment, a method may include heating the curable composition to a first temperature to form a partially cured article. In one embodiment, a partially cured reaction product may be post-cured by heating the partially cured composition to a second temperature to form a cured article. First curing temperature and the second curing temperature are as defined hereinabove.

In one embodiment, a method may include fabricating the curable composition into an article of a desired shape or size by a molding technique. In one embodiment, a molding technique may include one or more of resin transfer molding (RTM), reaction injection molding (RIM), structural reaction injection molding (SRIM), vacuum-assisted resin transfer molding (VARTM), thermal expansion transfer molding (TERM), resin injection recirculation molding (RICM), controlled atmospheric pressure resin infusion (CAPRI) or Seeman's composite resin infusion molding (SCRIMP). In one embodiment, a method may essentially include fabricating the article by resin infusion method. In one embodiment, a method may essentially include fabricating the article by vacuum-assisted resin transfer molding.

An article may be fabricated employing the compositions and methods described hereinabove. In one embodiment, an article is provided. An article includes reaction product of a filler having binding sites and a curable composition including a coupling agent composition, a polymer precursor, and a metathesis catalyst. In one embodiment, an article fabricated employing the compositions and methods disclosed herein may have a thickness that is greater than about 0.1 millimeters, greater than about 0.5 millimeters, greater than about 1 millimeters, greater than about 0.5 centimeter, greater than about 1 centimeter, greater than about 5 centimeter, or greater than about 10 centimeter.

In one embodiment, a laminate is provided. A laminate may include two or more layers. In one embodiment at least one layer may include a reaction product of a filler having binding sites and a curable composition including a coupling agent composition, a polymer precursor, and a metathesis catalyst. In one embodiment, the two or more layers may be bonded to each other. In one embodiment, a laminate may include at least one adhesive layer bonding the two or more layers.

In one embodiment, an article is a shaped component. In one embodiment, a shaped component may be employed as an aerospace component, a marine component, an automotive component, an industrial component, an electrical component, and other structural components.

In one embodiment, an article may be an turbine component used on aircraft or general power generation. In one embodiment, illustrative turbine components may include one or more of an inlet, a pylon, a pylon fairing, an acoustic panel, a thrust reverser panel, a fan blade, a fan containment case, a by pass duct, an aerodynamic cowl, or an airfoil component. In one embodiment, an article may be a turbine blade component or may be a turbine blade. In one embodiment, an article may be a wind rotor blade, tower, or nacelle for wind turbines.

In one embodiment, an article may be an airframe component. Illustrative aerospace components may include one or more of fuselage skin, wing, fairing, doors, access panel, aerodynamic control surface, or stiffener.

In one embodiment, an article may be an automotive component. Illustrative automotive components may include one or more of body panel, fender, spoiler, truck bed, protective plate, hood, longitudinal rail, pillar, or door.

Illustrative industrial components may include one or more of risers platforms, impact protection structures for oil and gas; bridges; pipes; pressure vessels; power poles, coils, containers, or radiators. Illustrative electrical components may include one or more of wound articles, such as coils of electric motors. In one embodiment, an article may be an eddy-current shielding component of a magnetic resonance imaging system.

EXAMPLES

The following examples are intended only to illustrate methods and embodiments in accordance with the invention, and as such should not be construed as imposing limitations upon the clauses.

Example 1

Preparation of Coupling Agent Composition

Methyl glycidyl ether norbornene (MGENB) is reacted with an aromatic amine at 180 degrees Celsius for 3 hours to form a coupling agent composition. Two different aromatic amines are employed: 4,4'-methylenebis(2,6-diethylaniline) (MBDEA) and o-tolidine employing different molar ratios of the norbornene to the amine. FIGS. 1 and 2 show the reaction scheme for synthesis of samples 1(a), 1(b), 2(a) and 2(b).

| Sample No. | Amine used in the coupling agent composition | Molar ratio of MGENB to amine in the coupling agent composition |
|---|---|---|
| 1(a) | MBDEA | 4:1 |
| 1(b) | MBDEA | 2:1 |
| 2(a) | o-tolidine | 4:1 |
| 2(b) | o-tolidine | 2:1 |

Example 2

Blending Coupling Agent Compositions with DCPD and Metathesis Catalyst

Coupling agent compositions, samples 1(a), 1(b), 2(a) and 2(b) prepared in Example 1 (10 weight percent) are blended with dicyclopentadiene. Blending is carried out at a temperature of 100 degrees Celsius using vigorous stirring.

1,3-Bis(2,4,6-trimethylphenyl)-2-imidazolidinylidene) dichloro(phenylmethylene)(tricyclohexylphosphine)ruthenium (CAS No. 246047-72-3) dispersed in $CH_2Cl_2$/heavy mineral oil is added to resin mixtures in an amount of 0.025 weight percent to form samples 3(a), 3(b), 4(a), and 4(b) as shown in Table 2. Room temperature viscosity of the resulting mixture is below 20 centipoise.

Example 3

Resin Work Life Measurements

Dicyclopentadiene is blended with 0.025 weight percent of metathesis catalyst dispersed in mineral oil and used as control sample 1. 5-methylamino norbornene (10 weight percent), 0.025 weight percent of metathesis catalyst dispersed in mineral oil, and dicyclopentadiene is used as control sample 2. Table 2 shows the composition details for DCPD compositions.

TABLE 2

Details of DCPD compositions

| Sample No. | Amine used in the coupling agent composition | Molar ratio of MGENB to amine in the coupling agent composition | Coupling agent weight fraction (%) | NA weight fraction (%) |
|---|---|---|---|---|
| 3(a) | MBDEA | 4:1 | 10 | |
| 3(b) | MBDEA | 2:1 | 10 | |
| 4(a) | o-tolidine | 4:1 | 10 | |
| 4(b) | o-tolidine | 2:1 | 10 | |
| Control sample 1 | | | | |
| Control sample 2 | 5-methylamino norbornene (NA) | | | 10 |

Figure 4:
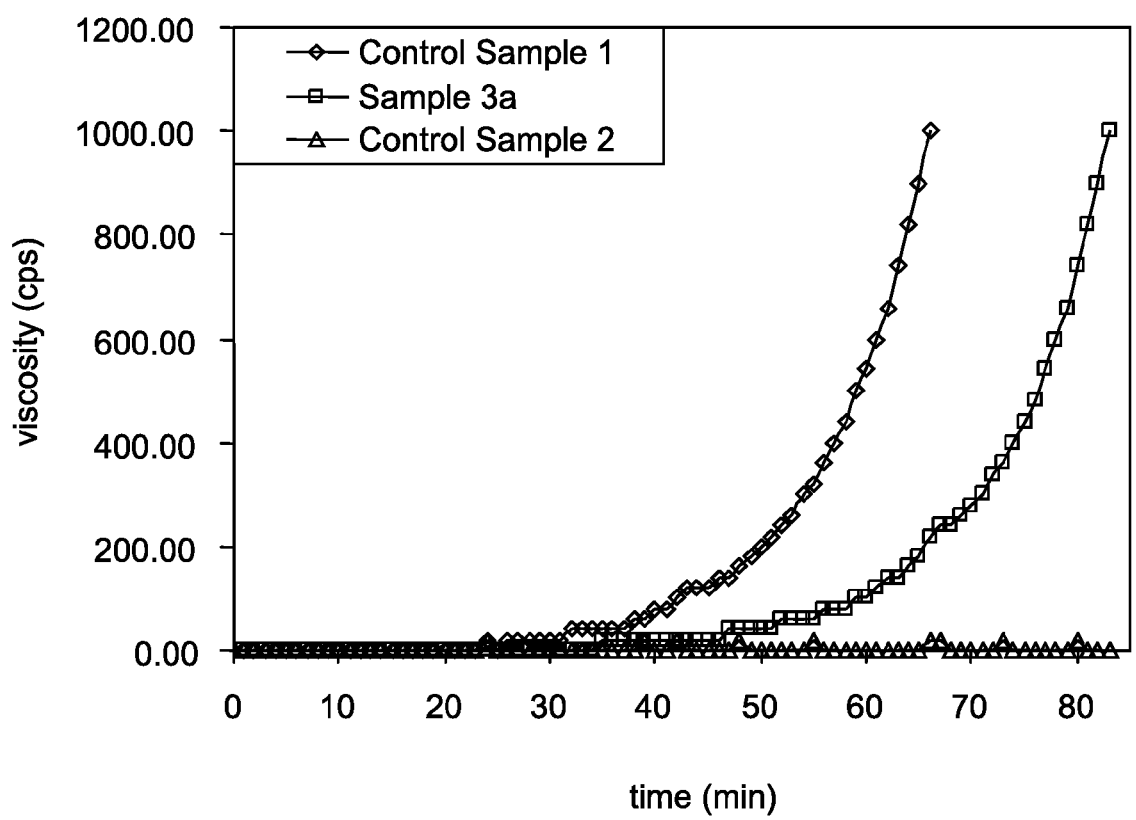
FIG. 4 shows the viscosity-time profile of dicyclopentadiene-based compositions.

Resin work life measurements are conducted by measuring viscosity as a function of time for sample 3(a) prepared in the Example 2, control sample 1, and control sample 2. The viscosity measurements were carried at room temperature. FIG. 4 shows the viscosity-time measurements for sample 3(a), control sample 1, and control sample 2. Control sample 1 (DCPD resin) shows an increase in viscosity with time and reaches a viscosity of 1000 centipoise around 65 minutes. Control sample 2 (DCPD and norbornene amine) shows no increase in viscosity with time at room temperature. For Control Sample 2 an instant color change to yellowish green was also observed. Norbornene amine may poison the metathesis catalyst in control sample 2 and hinder the polymerization reaction. Sample 3(a) shows an increase in viscosity with temperature as seen for control sample 1, indicating that the catalytic efficiency of the metathesis catalyst is not significantly effected by the coupling agent composition. As seen in FIG. 4 a room temperature viscosity value of sample 3(a) also reaches 1000 centipoise after 80 minutes.

Example 4

Preparation of DCPD Resin Plaques

Sample 3(a) prepared in Example 2 is poured into a mold preheated at 60 degrees Celsius. The resin is cured for 1 hour followed by post-curing at 200 degrees Celsius for 10 hours to form sample 5.

Control sample 1 prepared in Example 3 is poured into a mold preheated at 60 degrees Celsius. The resin is cured for 1 hour followed by post-curing at 200 degrees Celsius for 10 hours to form control sample 3.

Figure 5:
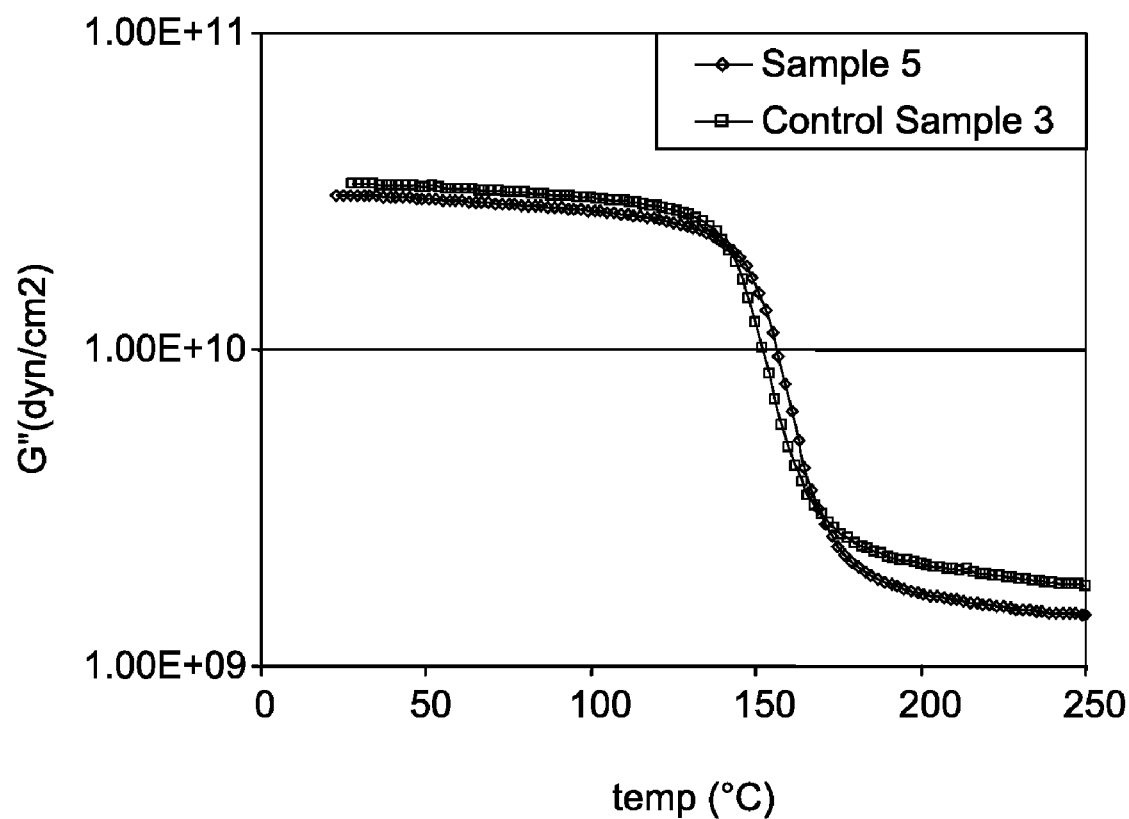
FIG. 5 shows the dynamic thermal analysis curves for dicyclopentadiene-based composites.

Glass transition temperature of sample 5 and control sample 3 is measured by dynamic mechanical thermal analysis (DMTA) using ASTM D4065 procedure. FIG. 5 shows the storage modulus as a function of temperature for sample 4 and control sample 3. The DMTA curves for the two samples are similar and both show a glass transition temperature ($T_g$) around 150 degrees Celsius using storage modulus onset, indicating that the degree of conversion for DCPD and coupling agent composition is similar to that of control DCPD composition.

Example 5

Preparation of Carbon Fiber Composites

Three different carbon fiber samples are used for casting carbon fiber composites: T300 PW fabric (obtained from Cytec), T650/35k, 8HS (obtained from Cytec Engineering Materials), and T700 GC Twill (obtained from Hexcel).

Control sample 1 is infused on T300 PW fabric at room temperature in 10 minutes to cast a carbon fiber panel via vacuum-assisted resin transfer molding technique. The composite panel is cured at 60 degrees Celsius for 1 hour, followed by post-curing at 200 degrees Celsius for 10 hours to form control sample 4.

Sample 3(a) is infused on T300 PW fabric, T650/35k, 8HS, and T700 GC Twill at room temperature in 10 minutes and carbon fiber panels are cast via vacuum-assisted resin transfer molding technique. The composite panels are cured at 60 degrees Celsius for 1 hour, followed by post-curing at 200 degrees Celsius for 10 hours to form samples 6, 7, and 8 respectively.

Figure 6:
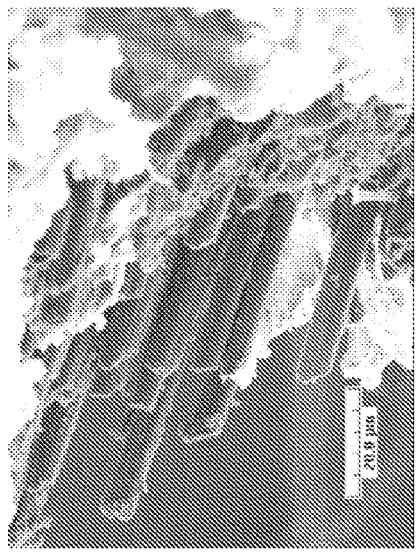
FIG. 6 shows the micrographs of dicyclopentadiene-based composites.
Figure 6:
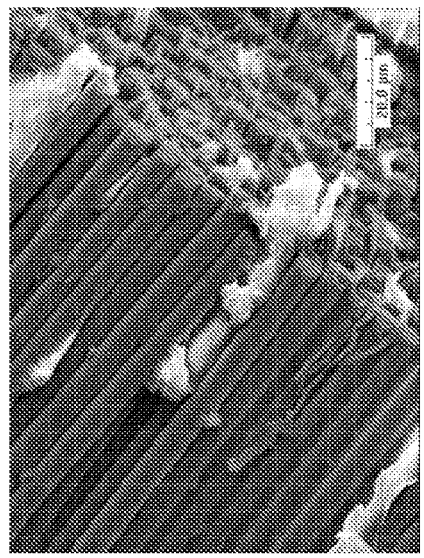
Figure 6:
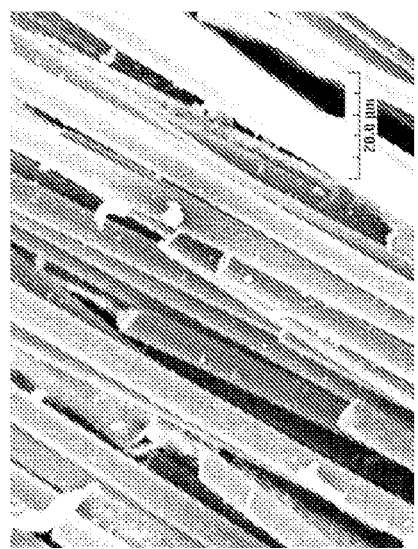
Figure 6:
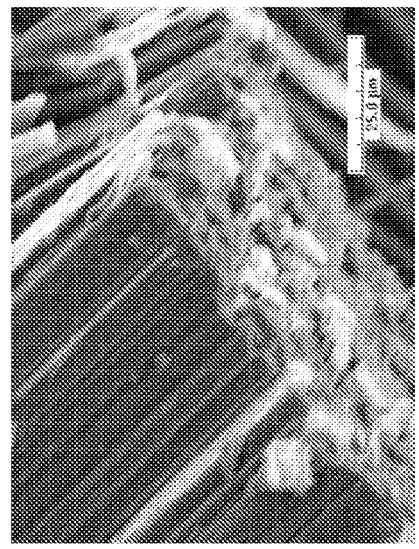
Figure 7:
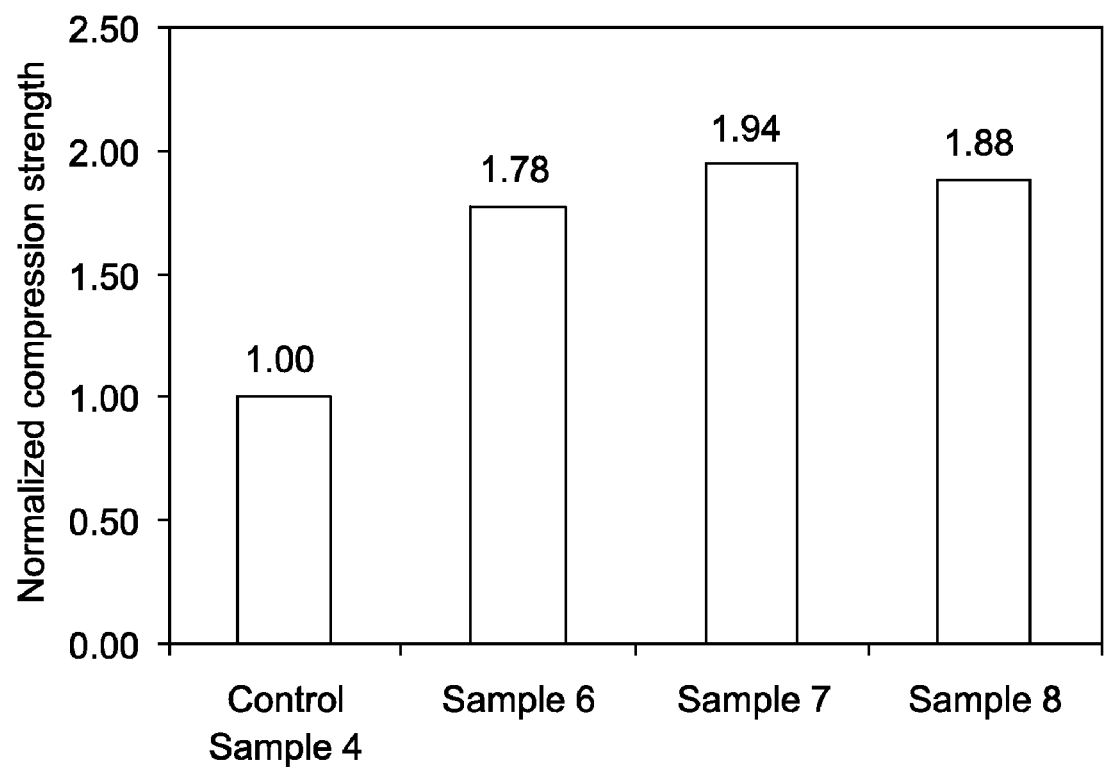
FIG. 7 shows the compression strength values for dicyclopentadiene-based composites.

FIG. 6 shows the micrographs of control sample 4, sample 6, sample 7, and sample 8. FIG. 7 shows the compression strength values measured using ASTM D6641 for sample 6, sample 7, and sample 8. The compression strength values are normalized using the value for control sample 4. Samples 6, 7, and 8 show more than 1.7 times the compression strength values when compared to control sample 4.

Example 6

Blending Coupling Agent Compositions with DCPD, Epoxy Compound, and Metathesis Catalyst Epoxy compounds: bisphenol-A epoxy (EPON 828) and DCPD Novolac (Epiclon HP-7200) are blended with sample 3(b) and sample 4(b) using different weight fractions of the epoxy compounds. Different weight fractions of epoxy compounds blended with sample 3(b) are 7.6 weight percent, 12 weight percent, and 24 weight percent. Different weight fractions of epoxy compounds blended with sample 4(b) are 9.1 weight percent and 14.5 weight percent.

Figure 8:
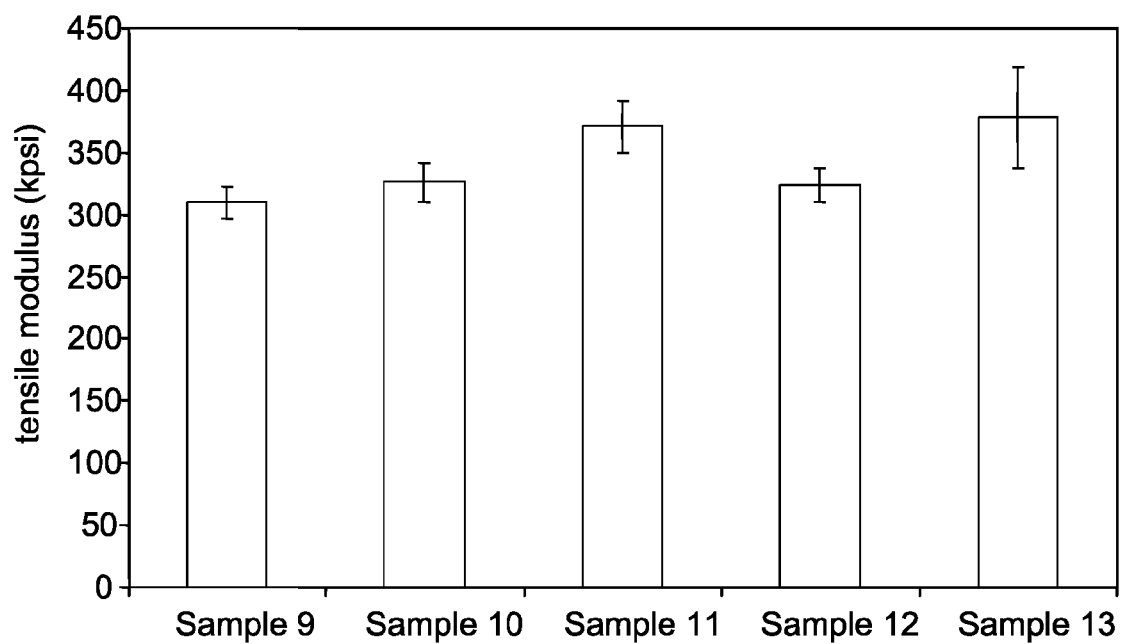
FIG. 8 shows the tensile strength values for dicyclopentadiene-epoxy compound-based resin plaques.

The resin mixtures are poured into a mold preheated at 60 degrees Celsius. The resin plaques are cured at 60 degrees Celsius for 1 hour, followed by post-curing at 200 degrees Celsius for 10 hours to form samples 9, 10, 11, 12, and 13. Table 2 shows the details for samples 9-13. FIG. 8 shows the tensile strength values measured for samples 9-13.

TABLE 2

Details of DCPD-epoxy compositions

| Sample No. | Amine used in the coupling agent composition | Coupling agent weight fraction (%) | Molar ratio of MGENB to amine in the coupling agent composition | Epoxy compound weight fraction (%) |
|---|---|---|---|---|
| 9 | MBDEA | 10 | 2:1 | 7.6 |
| 10 | MBDEA | 10 | 2:1 | 12 |
| 11 | MBDEA | 10 | 2:1 | 24 |
| 12 | o-tolidine | 10 | 2:1 | 9.1 |
| 13 | o-tolidine | 10 | 2:1 | 14.5 |

Example 7

Modification of Carbon Fibers Using Coupling Agent Compositions

A solution (50 weight percent) of a coupling agent composition 1(a) prepared in Example 1 is sprayed on the surface of a T700GC Twill carbon fiber fabrics (obtained from Toray Industries). The acetone is removed using a vacuum bag and the layup is pressed under 4 N force at 180 degrees Celsius for 3 hours. The DCPD resin modified with the coupling agent composition (Sample 3a) is then infused into the fiber layup within 10 minutes using the vacuum assisted resin transfer molding process. The composite panel is then cured at 60 degrees Celsius for 1 hour, followed by post-curing at 200 degrees C. for 10 hours to form Sample 14. The compression strength of the composite is measured to be 1.07 times that of compression strength of untreated carbon fibers and DCPD-coupling agent composition (Sample 8).

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The foregoing examples are illustrative of some features of the invention. The appended claims are intended to claim the invention as broadly as has been conceived and the examples herein presented are illustrative of selected embodiments from a manifold of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology may make equivalents and substitutions possible that are not now contemplated by reason of the imprecision of language; these variations should be covered by the appended claims.

The invention claimed is:
1. A composition, comprising:
a coupling agent having a formula selected from:

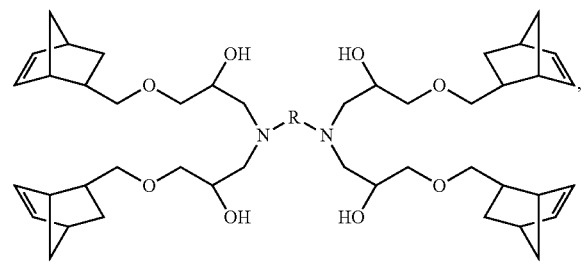

-continued

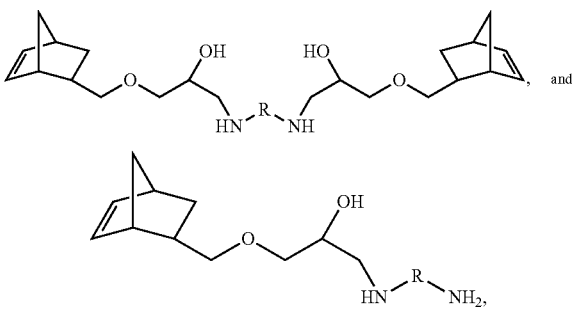

wherein R is a divalent aromatic radical having a formula selected from:

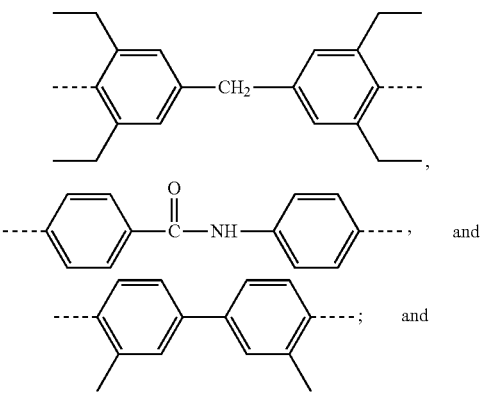

a polymer precursor comprising a second cycloolefin;
wherein the coupling agent is capable of bonding to a filler having a corresponding binding site,
and the coupling agent is compatible with a metathesis catalyst capable of catalyzing a ring-opening metathesis polymerization reaction when contacted with the second cycloolefin.

2. The composition as defined in claim 1, wherein the metathesis catalyst comprises a structure having a formula (I)

wherein "a" and "b" are independently integers from 1 to 3, with the proviso that "a+b" is less than or equal to 5;
M is ruthenium or osmium;
X is independently at each occurrence an anionic ligand;
L is independently at each occurrence a neutral electron donor ligand;
$R^1$ is hydrogen, an aliphatic radical, a cycloaliphatic radical, or an aromatic radical; and
$R^2$ is an aliphatic radical, a cycloaliphatic radical, or an aromatic radical, or two or more of X, L, $R^1$ and $R^2$ independently form a cyclic group.

3. The composition as defined in claim 1, wherein the second cycloolefin comprises a structure having a formula (XXX)

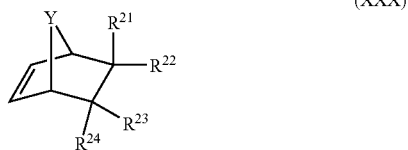

wherein $R^{21}$, $R^{22}$, $R^{23}$, and $R^{24}$ independently one or more of hydrogen, alcohol, thiol, ketone, aldehyde, ester, disulfide, carbonate, imine, carboxyl, amine, amide, nitro acid, carboxylic acid, isocyanate, carbodiimide, ether, halogen, quaternary amine, carbohydrate, peptide, phosphate, sulfate, sulfonate, or $R^{21}$, $R^{22}$, $R^{23}$, and $R^{24}$ together form a cycloaliphatic radical, an aromatic radical, a cycloolefin, an imide group, or a divalent bond linking two carbon atoms; and Y is $C(R^{25})_2$, $C=C(R^{25})_2$, $Si(R^{25})_2$, O, S, $NR^{25}$, $PR^{25}$, $BR^{25}$, or $AsR^{25}$, wherein $R^{25}$ is independently at each occurrence hydrogen, an aliphatic radical, a cycloaliphatic radical, or an aromatic radical.

4. The composition as defined in claim 1, wherein the second cycloolefin comprises one or more of dicyclopentadiene, norbornene, oxanorbornene, norbornadiene, cyclooctadiene, cyclooctene, cyclotetraene, cyclodecene, cyclododecene, or a derivative thereof.

5. The composition as defined in claim 1, wherein the coupling agent is present in an amount in a range of from about 0.5 weight percent to about 50 weight percent of the total weight of the composition.

6. The composition as defined in claim 1, wherein the coupling agent is capable of bonding to the corresponding binding sites on the filler by covalent bond formation.

7. The composition as defined in claim 1, wherein the binding site comprises one or more of an epoxy group, a hydroxyl group, an amine group, an amide group, a nitrate group, an isocyanate group, a carbamate group, a urea group, a carbonyl group, or a carboxylic group.

8. The composition as defined in claim 1, wherein the binding site comprises one or more of a silanol group, a siloxane group, or an acrylate group.

9. The composition as defined in claim 1, wherein the filler comprises a sizing composition comprising one or more of epoxy, urethane, polyvinyl alcohol, vinyl ester, polyester, or fatty acid ester.

10. The composition as defined in claim 1, wherein the coupling agent is capable of copolymerizing with the second cycloolefin when contacted with the metathesis catalyst.

11. The composition as defined in claim 1, having a room temperature viscosity that is less than about 200 centi Poise.

12. A composition, comprising:
the composition as defined in claim 1; and
a filler having a corresponding binding site capable of bonding with the coupling agent.

13. The composition as defined in claim 12, wherein the filler comprises one or more materials selected from the group consisting of siliceous materials, carbonaceous materials, metal hydrates, metal oxides, metal borides, and metal nitrides.

14. The composition as defined in claim 12, wherein the filler comprises a plurality of particles having a shape of a sphere, a rod, a tube, a flake, a plate, or a whisker, or the plurality comprises a combination of two or more of the foregoing shapes.

15. The composition as defined in claim 12, wherein the filler comprises a fibrous material.

16. The composition as defined in claim 15, wherein the fibrous material comprises a carbon fiber or a polymer fiber.

17. The composition as defined in claim 15, wherein the fibrous material comprises a glass fiber or a ceramic fiber.

18. The composition as defined in claim 15, wherein the fibrous material is configured as at least one of a yarn, a mat, a fabric, a woven roving, or a continuous filament.

19. The composition as defined in claim 12, wherein the filler is present in an amount in a range of from about 20 weight percent to 80 weight percent of the composition.

20. The composition as defined in claim 12, comprising a metathesis catalyst.

21. The composition as defined in claim 20, comprising a reaction control agent.

22. The composition as defined in claim 1, comprising a crosslinking agent.

23. The composition as defined in claim 22, wherein the cross-linking agent comprises a peroxide.

24. A composition, comprising:
a coupling agent comprising a reaction product of a first cycloolefin substituted with at least one epoxy group and an aromatic amine comprising at least two primary amine groups; and
a polymer precursor comprising a second cycloolefin;
wherein the coupling agent is capable of bonding to a filler having a corresponding binding site,
and the coupling agent is compatible with a metathesis catalyst capable of catalyzing a ring-opening metathesis polymerization reaction when contacted with the first cycloolefin.

25. The composition as defined in claim 24, wherein the first cycloolefin is methyl glycidyl ether norbornene.

26. The composition as defined in claim 24, wherein the aromatic amine is selected from t group consisting of:

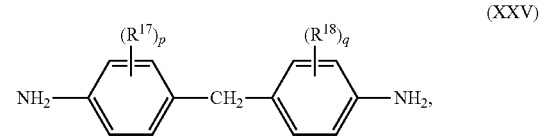

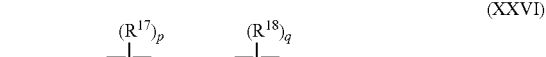

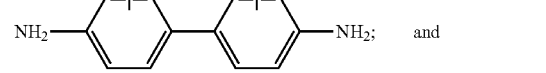

wherein "p" and "q" are independently 1, 2, 3, or 4; and $R^{17}$ and $R^{18}$ are independently at each occurrence an aliphatic radical.

27. The coupling agent as defined in claim 24, wherein a molar ratio of the first cycloolefin to the aromatic amine is in a range from about 1:1 to about 4:1.

* * * * *